(12) United States Patent
Winters et al.

(10) Patent No.: US 12,014,484 B2
(45) Date of Patent: Jun. 18, 2024

(54) THERMOGRAPHIC PHOSPHOR DIGITAL IMAGE CORRELATION

(71) Applicant: National Technology & Engineering Solutions of Sandia, LLC, Albuquerque, NM (US)

(72) Inventors: Caroline Winters, Cedar Crest, NM (US); Kathryn N. Gabet Hoffmeister, Albuquerque, NM (US); Elizabeth M. C. Jones, Cedar Crest, NM (US); Amanda Jones, Cedar Crest, NM (US); Jacob Thomas Mahaffey, Albuquerque, NM (US); Shannon Elizabeth Murray, Albuquerque, NM (US); Michael M. Montoya, Bernalillo, NM (US); Wendy Flores-Brito, Pittsburgh, PA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/838,777

(22) Filed: Jun. 13, 2022

(65) Prior Publication Data

US 2023/0401687 A1 Dec. 14, 2023

(51) Int. Cl.
*G06T 7/00* (2017.01)
*G06T 7/292* (2017.01)
(Continued)

(52) U.S. Cl.
CPC ............ *G06T 7/0004* (2013.01); *G06T 7/292* (2017.01); *G06T 7/85* (2017.01); *H04N 13/239* (2018.05);
(Continued)

(58) Field of Classification Search
CPC ......... G06T 7/0004; G06T 7/292; G06T 7/85; G06T 2207/10048; G06T 2207/30108; H04N 13/239; H04N 23/56
See application file for complete search history.

(56) References Cited

U.S. PATENT DOCUMENTS

| 2011/0273531 | A1* | 11/2011 | Ito ........................ H04N 13/261 348/43 |
| 2020/0395305 | A1 | 12/2020 | Mahaffey et al. |
| 2020/0398305 | A1* | 12/2020 | Mahaffey ........... C09K 11/7707 |

OTHER PUBLICATIONS

Tao (Two-dimensional lifetime-based kHz surface temperature measurement technique using phosphor thermometry—Cite as: Appl. Phys. Lett. 119, 244101 (2021); doi: 10.1063/5.0068203 Submitted: Aug. 23, 2021. Accepted: Nov. 26, 2021. Published Online: Dec. 13, 2021) (Year: 2021).*

(Continued)

*Primary Examiner* — Nasim N Nirjhar
(74) *Attorney, Agent, or Firm* — Kevin W. Bieg

(57) ABSTRACT

The invention advances the ratio method of phosphor thermography using two machine vision cameras for full-field temperature measurements of a solid surface. As an example, algorithms from digital image correlation (DIC) can be used to determine the stereoscopic imaging system intrinsic and extrinsic parameters, and accurately register material points on the sample to subpixel locations in each image with 0.07 px or better accuracy. A phosphor calibration sample fabricated using aerosol deposition can be used for in situ determination of the temperature-versus-intensity ratio relationship. The full calibration methodology and several improvements on two-color phosphor thermography open the door for full-field temperature measurements in dynamic tests with deforming test specimens. In particular, thermographic phosphors can be combined with stereo digital image correlation in a novel diagnostic, TP+DIC, to (Continued)

measure time-resolved full-field surface strains and temperatures simultaneously, thereby enabling testing in combined thermo-mechanical environments.

6 Claims, 25 Drawing Sheets

(51) Int. Cl.
    *G06T 7/80*     (2017.01)
    *H04N 13/239*     (2018.01)
    *H04N 23/56*     (2023.01)

(52) U.S. Cl.
    CPC ... *H04N 23/56* (2023.01); *G06T 2207/10048* (2013.01); *G06T 2207/30108* (2013.01)

(56) References Cited

OTHER PUBLICATIONS

Jones, E.M.C. et al., "Advances in Phosphor Two-Color Ratio Method Thermography for Full-Field Surface Temperature Measurements," Measurement Science and Technology, 2022, vol. 33, 085201, 16 pages.

Jones, E.M.C. et al., "Combined thermographic phosphor and digital image correlation (TP+DIC) for simultaneous temperature and strain measurements," 2022, Strain, e12415, 22 pages.

Alden, M. et al., "Thermographic Phosphors for Thermometry: A Survey of Combustion Applications, " Progress in Energy and Combustion Science, 2011, vol. 37, pp. 422-461.

Brubach, J. et al., "On Surface Temperature Measurements with Thermographic Phosphors: A Review," Progress in Energy and Combustion Science, 2013, vol. 39, pp. 37-60.

Allison, S.W. "A Brief History of Phosphor Thermometry," Measurement Science and Technology, 2019, vol. 30 072001, 6 pages.

Allison, S. W. and Gillies, G.T. "Remote Thermometry with Thermographic Phosphors: Instrumentation and Applications," Review of Scientific Instruments, 1997, vol. 68, pp. 2615-2650.

Dramicanin, M.D. "Trends in Luminescence Thermometry," Journal of Applied Physics, 2020, vol. 128, 040902-1-040902-18.

Kissel, T. et al., "Two-Dimensional Thermographic Phosphor Thermometry Using a CMOS High Speed Camera System," Applied Physics B, 2009, vol. 96, pp. 731-734.

Weber, V. et al., "Pixel-Based Characterisation of CMOS High-Speed Camera Systems," Applied Physics B Lasers and Optics, 2011, vol. 103, pp. 421-433.

Abram, C. et al., "Temperature measurement techniques for gas and liquid flows using thermographic phosphor tracer particles," Progress in Energy and Combustion Science, 2018, vol. 64, pp. 93-156.

Fond, B. et al., "Characterisation of the Luminescence Properties of BAM:Eu$^2$+ Particles as a tracer for thermographic particle image velocimetry," Applied Physics B Laser and Optics, 2015, vol. 121, pp. 495-509.

Abram, C. et al., "High-Speed Planar Thermometry and Velocimetry Using Thermographic Phosphor Particles," Applied Physics B Laser and Optics, 2013, vol. 111, pp. 155-160.

Linden, J. et al., "Limitations of ICCD Detectors and Optimized 2D Phosphor Thermometry," Measurement Science and Technology, 2012, vol. 23, 035201, 8 pages.

Furhman, N. et al., "Phosphor Thermometry: A Comparison of the Luminescence Lifetime and the Intensity Ratio Approach," Proceedings of the Combustion Institute, 2013, vol. 34, pp. 3611-3618.

Vackel, A. "In Situ Substrate Curvature Measurement of BaTiO$_3$ Films Deposited by Aerosol Deposition," Journal of Thermal Spray Technology, 2020, vol. 30, pp. 584-590.

Hanft, D. et al., "The Aerosol Deposition Method: A Modified Aerosol Generation Unit to Improve Coating Quality," Materials, 2018, vol. 11, 1572, 11 pages.

Mahaffey, J. et al., "Fabrication of Phosphorescent Oxide Coatings Using the Aerosol Deposition Technique," Proceedings of SPIE Optical Systems Design, 2021, vol. 11872, pp. 118720M-1-118720M-11.

Yule, L. et al., "Surface Temperature Condition Monitoring Methods for Aerospace Turbomachinery: Exploring the Use of Ultrasonic Guided Waves," Measurement Science and Technology, 2021, vol. 32, 052002, 18 pages.

Cai, T. et al., "Simultaneous Measurement of Two-Dimensional Temperature and Strain Fields Based on Thermographic Phosphor and Digital Image Correlation," Measurement Science and Technology, 2021. vol. 32, 095204, 8 pages.

"Thermographic PIV," LaVision Focus on Imaging. https://www.digitalimagecorrelation.com/en/products/flowmaster/thermographic-piv/.

"LIF Image Processing Software," LaVision Focus on Imaging. https://www.smart-piv.com/en/applications/mixing-and-thermal-flows/scalar-imaging-software/index.php.

* cited by examiner

THERMOGRAPHIC PHOSPHOR DIGITAL IMAGE CORRELATION

STATEMENT OF GOVERNMENT INTEREST

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosures are submitted under 35 U.S.C. 102(b)(1)(A): Elizabeth Jones, Amanda Jones, Kathryn N. G. Hoffmeister, and Caroline Winters, "Advances in phosphor two-color ratio method thermography for full-field surface temperature measurements", *Measurement Science and Technology*, accepted manuscript online 22 Apr. 2022; and Elizabeth M. C. Jones, Amanda R. Jones, and Caroline Winters, "Combined thermographic phosphor and digital image correlation (TP+DIC) for simultaneous temperature and strain measurements", *Strain*, version of record online 17 May 2022. The subject matter of this disclosure was conceived of or invented by the inventors named in this application.

FIELD OF THE INVENTION

The present invention relates to temperature and strain measurement and, in particular, to full-field thermography measurements using thermographic phosphors and digital image correlation.

BACKGROUND OF THE INVENTION

Non-contact, full-field temperature measurements can be accessed through several techniques, including temperature sensitive paints (TSP), pyrometry, and infrared (IR) thermography. However, the limitations of each have motivated alternative thermometry including thermographic phosphors (TPs)—transition or rare-earth elements doped in ceramic matrices. These can be applied for optical sensing of surface, gas phase, and bulk material temperatures; the wide range of applications have been outlined in topical reviews and the references therein. See M. Alden et al., *Prog. Energ. Combust.* 37(4), 422 (2011); J. Brubach et al., *Prog. Energ. Combust.* 39(1), 37 (2013); S. W. Allison, *Meas. Sci. Technol.* 30(7), 072001 (2019); S. W. Allison and G. T. Gillies, *Rev. Sci. Instrum.* 68(7), 2615 (1997); and M. D. Dramicanin, *J. Appl. Phys.* 128, 1 (2020). The chemical physics of the phosphors is a two-part mechanism; initial absorption of incident photons excites electrons from the luminescent atoms into higher energetic states, followed by the subsequent relaxation back to a lower energetic state (the ground state) through spontaneous emission or internal energy transfer.

Different strategies can be used in phosphor thermography, including the time-decay method, time-integrated method, and frequency-domain method. See J. Brubach et al., *Prog. Energ. Combust.* 39(1), 37 (2013). The time-decay method is generally considered more precise, but it normally requires a high speed camera for full-field measurements. However, there have been recent efforts to relax this requirement. One such effort is the lifetime-ratio approach, where a frame rate camera or in-line CCD has been employed to take data frames during both steady-state excitation and at some time during the decay, and the ratio was found to be thermographic. See T. Cai et al., *Exp. Therm. Fluid Sci.* 80, 53 (2017); G. Sutton et al., *Meas. Sci. Technol.* 30(4), 044002 (2019); and C. Abram et al., *Opt. Lett.* 45(14), 3893 (2020). This removes the requirement for high-speed camera architecture to resolve the phosphor decay, provided the test sample remains "frozen" between camera frames. See T. Cai et al., *Exp. Therm. Fluid Sci.* 80, 53 (2017); and G. Sutton et al., *Meas. Sci. Technol.* 30(4), 044002 (2019). Scientific detectors are still required, and current achievable data acquisition rates are 10 Hz, which limits the applicability of these techniques to dynamic tests. See G. Sutton et al., *Meas. Sci. Technol.* 30(4), 044002 (2019); and C. Abram et al., *Opt. Lett.* 45(14), 3893 (2020). Another option provides 2D measurements at kHz rates through a combination of the time-decay and frequency-domain methods; the phosphor is excited with a repetitive excitation signal, and the intensity between the crests and troughs of the emission signal are ratioed and related to the temperature. See T. Cai et al., *Appl. Phys. Lett.* 119(24), 244101 (2021).

SUMMARY OF THE INVENTION

The present invention is directed to a spectral ratio method for phosphor thermography. The method comprises providing a specimen coated with a thermographic phosphor (TP), illuminating the specimen with incident light having a wavelength within an absorption feature of the thermographic phosphor, collecting and spectrally filtering an emission of the thermographic phosphor for an exposure time into a first spectral band image of a first camera and a second spectral band of a second camera of a stereoscopic imaging system, correcting the first and second cameras for non-linear behavior, spatially registering the first and second spectral band images using stereo digital image correlation (DIC), calculating ratios of the intensities of the first and second spectral bands for each pixel of the spatially registered spectral band images, and inferring a spatially resolved temperature image of the specimen from the spatially resolved intensity ratios using a temperature-vs-intensity ratio calibration curve, thereby providing a time-resolved, full-field thermographic image of the specimen. The temperature-vs-intensity ratio calibration curve can be generated by an in situ calibration procedure. Time-resolved, full-field thermographic images can be obtained by repeating the collecting, calculating, and inferring steps for a plurality of times. The method can further comprise patterning the thermographic phosphor on the substrate, imaging the pattern, and tracking the pattern image with stereo digital image correlation as the specimen is deformed. A time-resolved, full-field strain image can be calculated from the tracked pattern image. Therefore, TP+DIC can be employed to characterize the time-resolved strain and temperature fields of a test specimen simultaneously.

BRIEF DESCRIPTION OF THE DRAWINGS

The detailed description will refer to the following drawings, wherein like elements are referred to by like numbers.

DETAILED DESCRIPTION OF THE INVENTION

Figure 1:
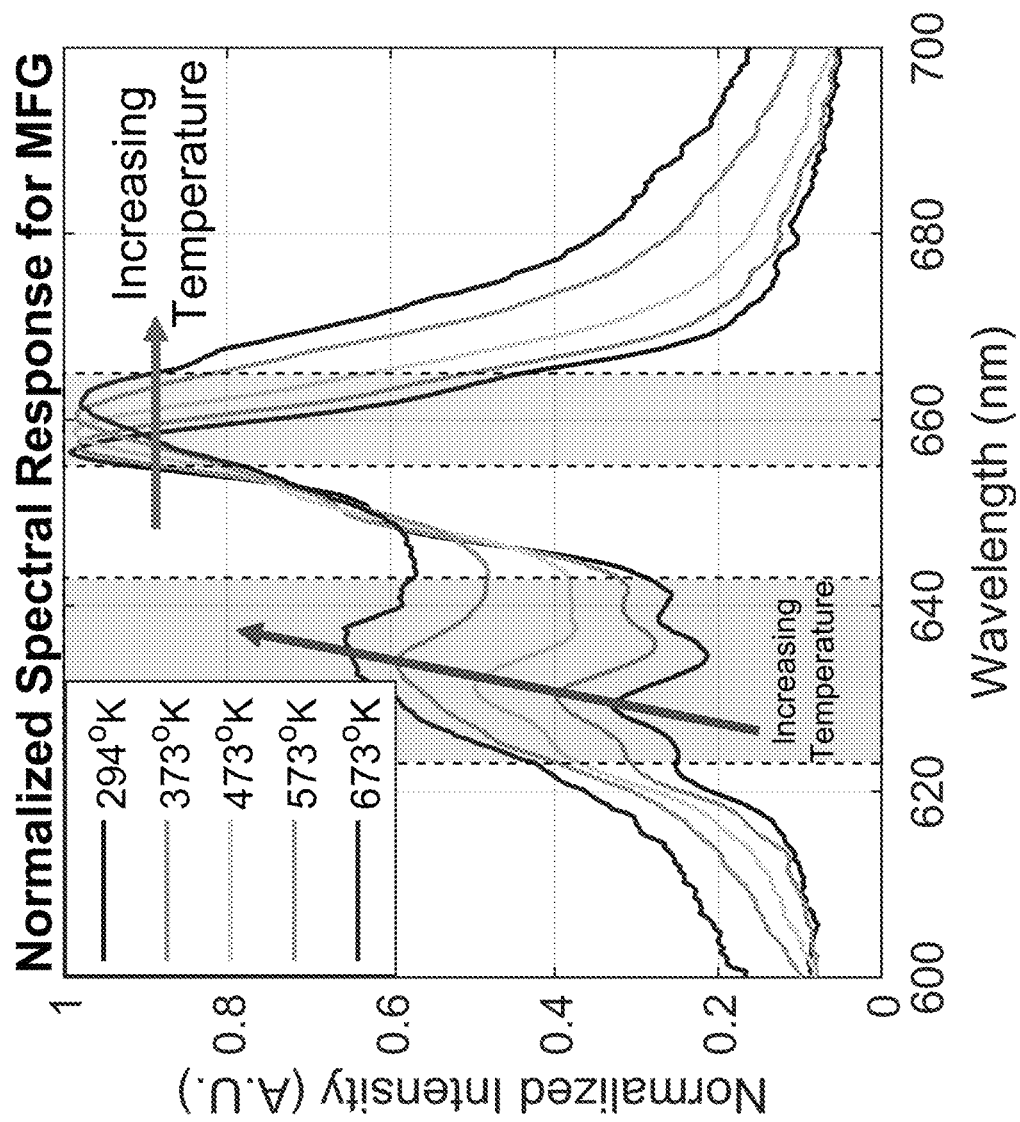
FIG. 1 shows thermographic phosphor spectra for aerosol-deposited $Mg_3F_2GeO_4$:Mn (MFG) phosphor, showing temperature effects in the spectrally resolved emission. Translucent boxes show the two bandpass regions used herein to demonstrate the invention ($\lambda_{633}$=633 nm±10 nm and $\mu_{660}$=660 nm±5 nm), and arrows indicate trends with increasing temperature within those bands.

As an alternative to phosphor time-decay methods, the present invention is directed to a time-integrated method, also known as the "spectral method" or "ratio method." In the ratio method, detectors integrate over a period of time, collecting and spectrally filtering phosphor emission to isolate specific transitions. The emission intensity in two or more spectral bands are then ratioed, and a calibration curve is generated between the intensity ratio and the known temperature. This ratio method is depicted in FIG. 1.

The ratio method, especially 2D, full-field applications using CCD or CMOS detectors, has several known limitations and challenges, including nonlinearity of the detectors (which affects all phosphor thermography strategies), sensitivity to small deviations in geometry of the experimental setup, and imprecise registration of material points on the test specimen or object to subpixel locations in each image. See T. Kissel et al., *Appl. Phys. B* 96(4), 731 (2009); V. Weber et al., *Appl. Phys. B* 103(2), 421 (2011); C. Abram et al., *Prog. Energ. Combust.* 64, 93 (2018); B. Fond et al., *Appl. Phys. B* 121(4), 495 (2015); C. Abram et al., *Appl. Phys. B* 111, 155 (2013); J. Linden et al., *Meas. Sci. Technol.* 23(3), 035201 (2012); J. Brubach et al., *Prog. Energ. Combust.* 39(1), 37 (2013); and N. Fuhrmann et al., *Proc. Combust. Inst.* 34(2), 3611 (2013). The first can be addressed with a careful characterization of the detector response with subsequent corrections, and the second can be addressed with an in situ calibration. Imprecise registration, though, has remained problematic in the phosphor community. The present invention provides a novel improvement by augmenting image analysis processes for the ratio method with digital image correlation (DIC) for accurate and precise subpixel image registration.

As described herein, careful treatment of experimental factors and image processing advances the ratio method for phosphor thermography. Specifically, the description focuses on the phosphor calibration process required to generate the temperature-versus-intensity ratio calibration curves that are ultimately used to infer temperature of the test specimen or object of interest. This detailed analysis of the calibration procedure was performed as part of an examination of material temperature rise due to the conversion of plastic work into heat; however, the advances presented herein are application independent and relevant to any full-field thermography measurement.

The description is organized as follows: First, the calibration coupon, coated with a phosphor via aerosol deposition, and the experimental set-up are described. Then, the in situ phosphor calibration procedure is outlined. Next, a description of DIC methodology is presented, including the calibration of the stereoscopic imaging system and spatial registration of the two images in each stereo-pair. A brief description of the nonlinear detector corrections is presented. Lastly for the methods section, the process for computing the intensity ratio is outlined. The description then focusses first on how employing DIC for image registration improves the ratio method. Next, temperature-dependent spatial non-uniformities of the intensity ratio field are discussed. A standard flat-field correction is shown to be ineffective to remove these non-uniformities for the current experimental setup with non-collimated light from an extended light source. To address this issue, a strategy to generate and use pixel-wise calibration curves is presented. This provides a path forward to field phosphor thermography in dynamic and challenging environments. Finally, an uncertainty quantification of the calibration procedure is performed.

Phosphor Calibration Sample Fabrication

A wide variety of deposition or additive manufacturing processes can be used to apply the thermographic phosphor coating to a substrate. However, in order to generate a robust coating of phosphors that adhered well to the substrate with no need for binders, a tailored process for aerosol deposition (AD) was developed. The AD setup has been described by Vackel and Hanft et al., with additional process development described by Mahaffey et al. See A. Vackel, *J. Therm. Spray Technol.* 30(3), 584 (2020); D. Hanft et al., *Materials* 11(9), 1572 (2018); J. T. Mahaffey et al., "Fabrication of phosphorescent oxide coatings using the aerosol deposition technique," In *SPIE Optical Systems Design, Advances in Optical Thin Films VII*, vol. 11872 (2021); and U.S. application Ser. No. 16/901,492 to Mahaffey et al., filed Jun. 15, 2020, which are incorporated herein by reference. A wide variety of thermographic phosphors comprising ceramic host materials doped with transition or rare-earth elements can be deposited by aerosol deposition. As an example, manganese-doped magnesium fluorogermanate ($Mg_3F_2GeO_4$:Mn, (MFG) phosphor powder was obtained from Phosphor Technology Ltd and ball-milled, dried, and then ground with a mortar and pestle and sieved to <180 µm. The powder was aerosolized in helium using a rotating brush generator (RBG), RBG1000isd powder feeder, and a particle sizing cyclone and then accelerated to supersonic speeds through a 3D printed Vero polymer DeLaval converging-diverging nozzle into a vacuum to impinge on the sample. Initial powder impact results in particle fracturing (usually to length scales of tens of nanometers) and generates subsequent ductile behavior once a critical crystallite size is reached. See J. Akedo, *J. Am. Ceram. Soc.* 89(6), 1834 (2006). Since aerosol deposition is a room-temperature kinetic spray process, the coating is built up through impact consolidation of the fractured pieces of powder. The result is a nano-crystalline structure with densities that can exceed 95% of bulk and approach nearly full density. See P. Sarobol et al., *Aerosol deposition: Room temperature solid-state deposition of ceramics*, SAND Report, SAND2016-2870 (2016); and S. D. Johnson et al., *Mater. Res. Bull.* 76, 365 (2016).

The calibration sample was a stainless steel plate (50×125 $mm^2$, 1.6 mm thick, or 2×5 $in.^2$, 1/16 in. thick). The sample was cleaned using a WypAll with acetone, followed by isopropanol and then distilled water. Two, nominally homogenous phosphor strips (19×44 $mm^2$, or 0.75×1.75 $in.^2$) were deposited using aerosol deposition. A laser scanning profilometer was used to determine that the phosphor thickness was approximately 4 µm.

A metal ceramic heater (Heat Scientific, 50×50 $mm^2$ (2×2 $in.^2$), 60 W, maximum temperature of 1073° K) was attached to the back of the plate with metal foil tape and powered by a BK Precision 1685B power supply. Two Type-E thermocouples were spot-welded to the sample face in between the two phosphor strips to provide reference temperatures. Note that the total area encompassed by the two phosphor strips (44×44 mm$^2$) was purposefully fabricated to be smaller than the active area of the heater (50×50 mm$^2$) in order to produce a homogeneous temperature field over the region-of-interest of the phosphor calibration sample. The two thermocouples, which were placed approximately 22 mm apart, agreed to within 0.2° K at room temperature (303° K) and 3.2° K at the highest temperature used (423° K), indicating that the temperature field was homogeneous to within 1% of the sample temperature. The average of the two thermocouples was taken as the reference temperature when computing the calibration curves as described below.

Experimental Setup for TP+DIC

When generating the temperature-versus-intensity ratio calibration curve for the ratio method of phosphor thermography, an in situ calibration is the best practice to remove known geometric sensitivities, such as camera position or orientation. Therefore, a calibration analysis was performed with the camera geometry, specimen mounting, and field-of-view designed for subsequent material testing in a uniaxial load frame. Factors contributing to temperature uncertainty inherent to the equipment, such as detector non-linearity, lens effects, and excitation fluence were performed on a bench top setup that mimicked the in situ setup (not shown).

Figure 2:
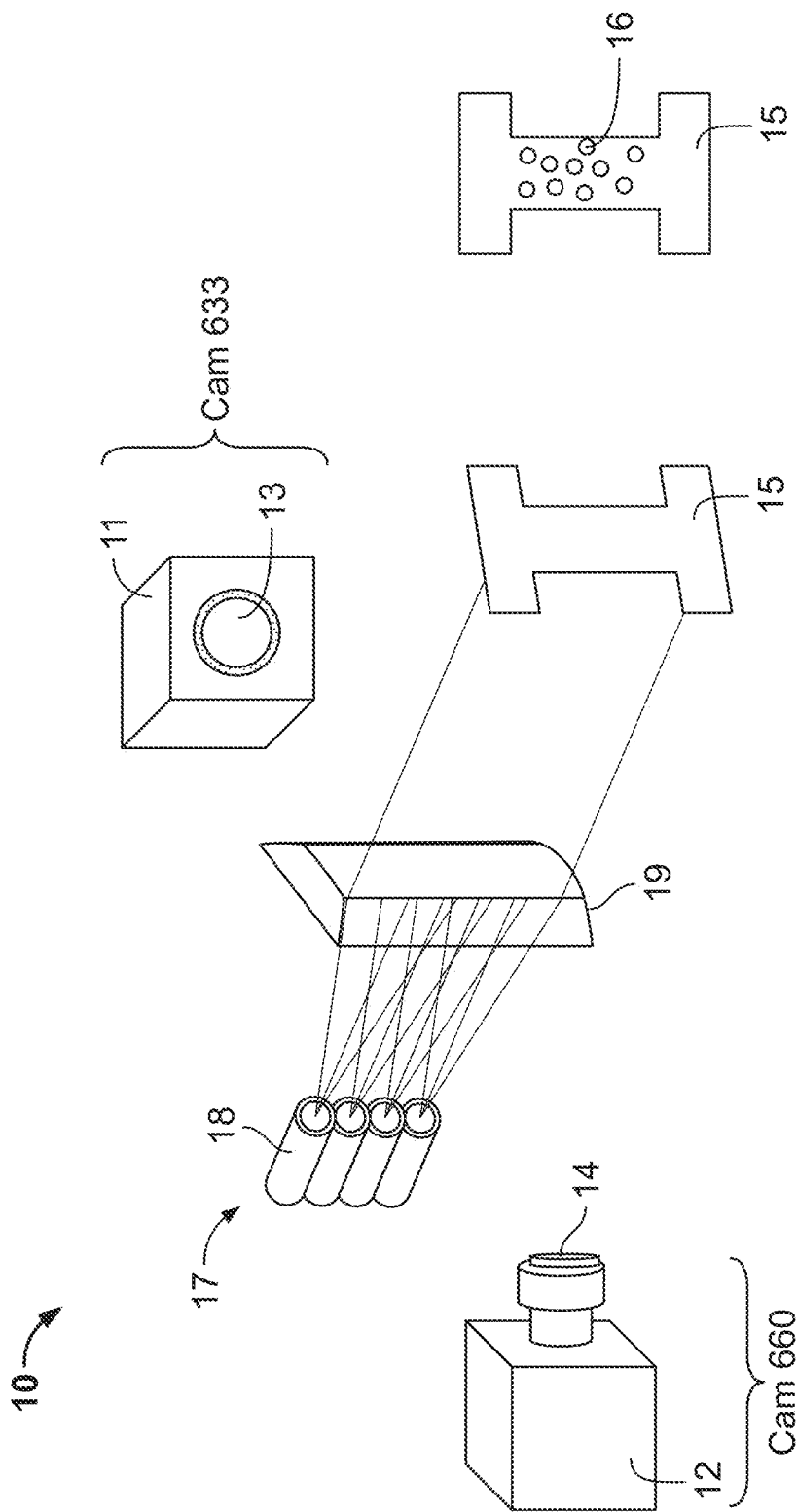
FIG. 2 is a schematic illustration of an experimental setup designed for material testing which was used to improve phosphor thermography through careful in situ calibration.

A schematic illustration of an exemplary in situ setup 10 is shown in FIG. 2. In this example, two machine vision cameras 11 and 12 (FLIR (formerly PointGrey) Grasshopper 2.3 MP USB3.0 cameras (1920×1200 px$^2$, frame rate 153 FPS)) with 75 mm DG Series Edmund Optics lenses imaged the specimen 15 with a stand-off distance of approximately 590 mm, leading to an average image scale of 21.5 px/mm and a field-of-view of approximately 90×55 mm$^2$. Each camera lens had an Andover bandpass filter attached; the first filter 13 for the first camera 11 was centered at $\lambda_{633}$=633 nm±10 nm, and the second filter 14 for second camera 12 was centered at $\lambda_{660}$=660 nm±5 nm. The two imaging systems are denoted herein by the filters as "Cam$_{633}$" and "Cam$_{660}$", respectively. The cameras 11 and 12 were rotated to align the long axis of the cameras with the long axis of the specimen 15. The entire load frame was encased in a light tight black-out tent to prevent room light from influencing the phosphor emission results.

The test specimen 15 was illuminated with an excitation source 17 comprising four Hamamatsu LIGHTNINGCURE LEDs 18 ($\lambda_1$=365 nm with nominal fluence of 1 W/cm$^2$ per LED), which were focused onto the specimen 15 using a cylindrical, combining and focusing lens 19, such that each lamp was overlapped onto the same area of the specimen 15. This wavelength lies on an absorption feature for the MFG phosphor, thereby providing efficient illumination. The specimen 15 can be coated with a continuous or patterned 16 coating of phosphor as shown in the front view schematic. Because uniformity of the excitation fluence from the overlapped LEDs could not be guaranteed over the entire field-of-view of the images, the effect of excitation fluence level on the intensity ratio was investigated systematically using a benchtop setup. For the range of fluences used herein, the intensity ratio was found to be independent of excitation fluence, as described in the section titled Effects of Excitation Fluence.

The LED lamps were pulsed at 3 Hz with 150 ms pulse width to minimize specimen temperature rise due to the impinging UV excitation light. Given that the decay time of MFG phosphor is ca. 3 ms at room temperature and decreases at higher temperatures, the 150 ms pulses were effectively constant illumination in terms of the phosphor response time scale. See J. Brubach et al., *Prog. Energ. Combust.* 39(1), 37 (2013). Prior to testing, the lamps were warmed-up for at least 30 minutes to allow the light intensity to stabilize and the initial specimen temperature to equilibrate at 3° K above room temperature (as measured by the thermocouple spot-welded to the specimen surface).

The cameras and the lamps were synchronized with a Stanford Research Systems Delay/Pulse Generator (model number DG535), with a delay set to ensure the image was exposed during the steady portion of the lamp pulse. Additionally, E-type thermocouples (not shown) were welded to the backside of the specimen and recorded with a cDAQ (National Instruments) system and synchronized with the images through the camera control software (VicSnap, Correlated Solutions).

Image Acquisition of Heated Phosphor Calibration Sample

The phosphor calibration sample was mounted to an adjustable rig and placed in the space between the grips of a load frame. The field-of-view for each camera was approximately 55 mm horizontally by 90 mm vertically, with the central portion of ca. 13 mm by 80 mm being the main area-of-interest based on the ultimate application. However, the phosphor calibration sample size was limited by heater availability and the aerosol deposition process such that the area covered by the phosphor was approximately 44×44 mm$^2$. Therefore, in order to obtain phosphor calibration data throughout the entire area-of-interest, the sample was swept vertically through the space between the load frame grips. Additionally, to account for some small magnitude out-of-plane motion that can occur during the application of interest, the phosphor calibration sample was also plunged slightly towards/away from the cameras within the depth-of-field of the imaging systems.

The calibration sample was heated to six different temperatures, T=[303, 323, 348, 373, 398, 423]° K (T=[30, 50, 75, 100, 125, 150]° C.), and allowed to equilibrate at each temperature. At each temperature, the sample was swept through the field-of-view and depth-of-field as described above, and approximately 75-90 images were captured during these motions.

The exposure time was set to be the same in both cameras for the phosphor calibration, varying from ca. 130 ms at room temperature down to ca. 100 ms at 423° K (150° C.). The exposure time was adjusted to account for the decreased phosphor luminescent irradiance at lower temperatures, in order to maintain a high signal-to-noise ratio of the images.

Digital Image Correlation (DIC) Procedure

The invention can use stereo-DIC to accurately map material points from Cam$_{633}$ to Cam$_{660}$ before computing the intensity ratio for phosphor thermography measurements. In the next sections, basic DIC principles, the stereoscopic imaging system calibration procedure, and the image correlation process to perform the mapping are described.

DIC Overview

DIC is an optical, non-contact diagnostic that provides full-field measurements of the shape, motion and deformation of a solid test specimen subjected to applied loading. See M. A. Sutton et al., *Image Correlation for Shape, Motion, and Deformation Measurements: Basic Concepts, Theory, and Applications*, Springer US (2009). The basic approach of DIC is to apply a high-contrast pattern to the surface of the test specimen and image the pattern while the test specimen is loaded/deformed. The principle of optical flow or conservation of intensity dictates that the intensity of the deformed image should equal the intensity of the undeformed image, after appropriate warping or deformation between the two images is taken into account. Therefore, a cost function or matching criterion that is based on the difference between the deformed and undeformed image intensities is minimized to determine the test specimen motion/deformation. To account for overall lighting changes, a normalized criterion is often employed, such as the zero-normalized sum-of-square-differences (ZNSSD). In local or subset-based DIC, the reference image is divided into small regions, called subsets, and the correlation or matching is performed on each subset individually.

Figure 3:
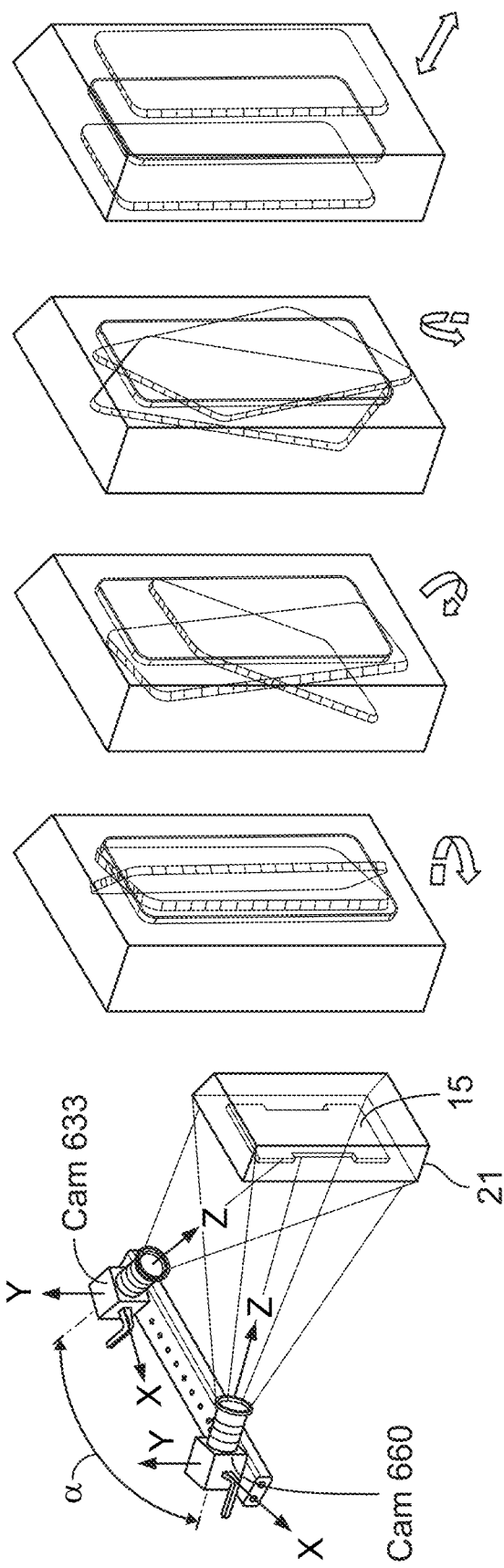
FIG. 3 is a schematic illustration of a DIC calibration target and the resulting movements required for proper calibration. A left-hand coordinate system is shown in the figure.

2D-DIC employs a single camera perpendicular to a planar test specimen undergoing planar motion/deformation and provides two-component displacements in the plane. As shown in FIG. 3, stereo-DIC employs two cameras 12 and 13 oriented at a stereo angle α and provides displacements in all three directions of the visible surface of a test specimen 15 of arbitrary geometry within a calibration volume 21 defined by the overlapping fields-of-view and depths-of-field of the cameras. A key component to stereo-DIC is a calibration of the stereoscopic imaging system to determine the extrinsic parameters (i.e. the three translations and three rotations that relate the position of one of the cameras relative to the other camera in the world coordinate system) and the intrinsic parameters (e.g. pixel-coordinates for the center of detector ($C_x$ and $C_y$), lens focal length ($f_x$ and $f_y$), detector skew (s), and parameters of a spatial lens distortion model (e.g. $k_1$ and $k_2$ for a second-order radial model)). Broadly speaking, stereo-DIC first maps material points from one camera to the other using the principle of optical flow. Then, it uses the calibration parameters of the stereoscopic imaging system to project the points from each camera out into 3D space; the 3D world coordinate location is determined through triangulation as the intersection point of the two ray projections.

Stereoscopic Imaging System Calibration

A standard dot-grid calibration target (4 mm dot spacing, Correlated Solutions) was placed in the area between the grips of the load frame, where the test specimen would be inserted, and image sets were taken following the standard procedure for DIC calibration as the target was tilted and rotated using the motorized stage; the target was additionally plunged towards and away from the cameras manually.

The illumination for this stereo-imaging system calibration was white light, which generated different image brightness between the two bandpass filter/camera pairs. In order to ensure high quality images for calibration, the exposure times of the two cameras were set independently: 340 ms was used for $Cam_{660}$, and 80 ms was used for $Cam_{633}$. A second-order radial spatial lens distortion model was employed for calibration through commercial software (Correlated Solutions, VIC3D-9). The final stereoscopic calibration parameters are given in Table 1.

TABLE 1

Intrinsic and extrinsic parameters of the stereoscopic imaging system

| Intrinsic Parameter | $Cam_{660}$ | $Cam_{633}$ |
| --- | --- | --- |
| Horizontal detector center, $C_x$ | 942.861 px | 967.618 px |
| Vertical detector center, $C_y$ | 592.957 px | 599.83 px |
| Horizontal/vertical focal length, $f_x$ and $f_y$ | 14138.9 px | 14192.5 px |
| Skew, s | 0 | 0 |
| Radial lens distortion 1, $\kappa_1$ | −0.0562293 | 0.00376747 |
| Radial lens distortion 2, $\kappa_2$ | 12.9742 | −2.12835 |

| Extrinsic Parameter | Value |
| --- | --- |
| X-axis rotation, α | −28.3535° |
| Y-axis rotation, β | −0.164127° |
| Z-axis rotation, γ | −0.979154° |
| X-axis translation, $T_x$ | −2.4426 mm |
| Y-axis translation, $T_y$ | −313.31 mm |
| Z-axis rotation, $T_z$ | 70.4406 mm |

Image Correlation and Registration

Figure 4:
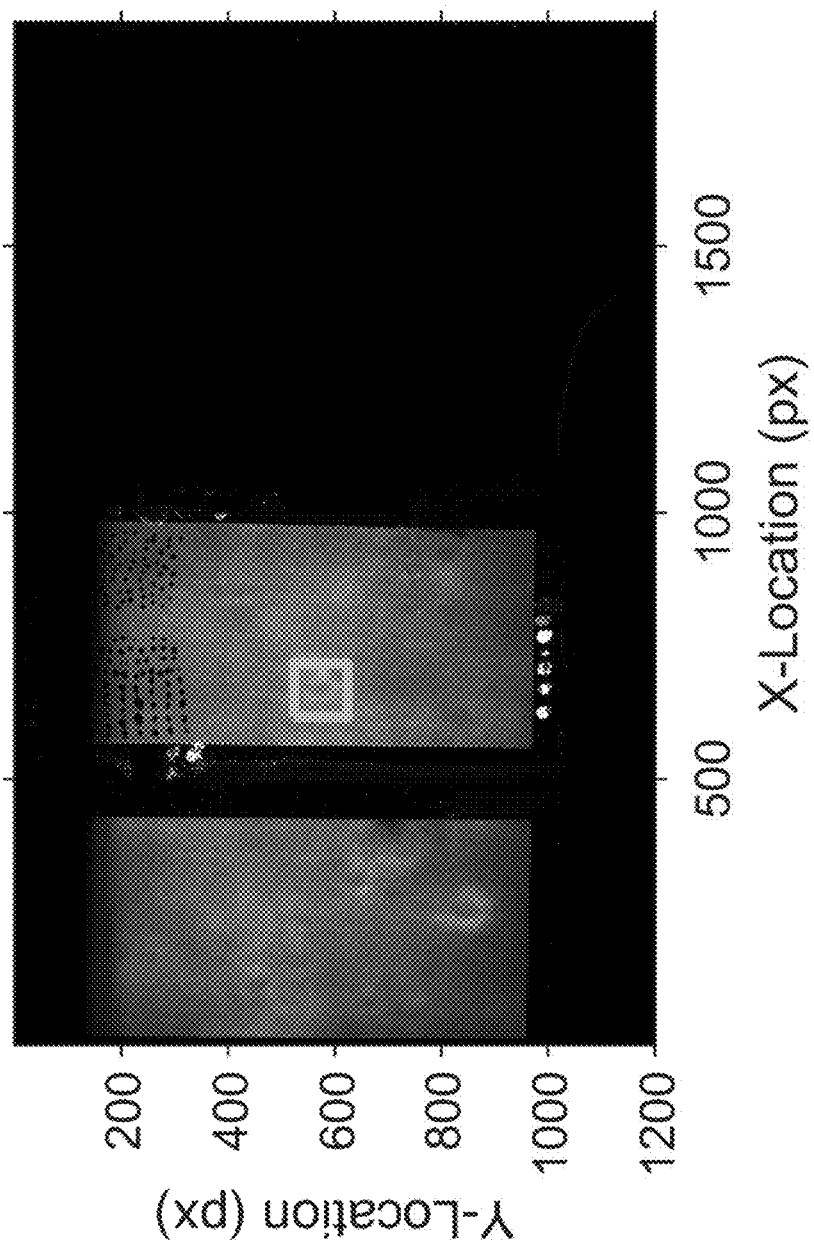
FIG. 4 is a representative image of the phosphor calibration sample, illuminated by the UV lamps, from $Cam_{660}$. In this image, the calibration sample was near the top grip, which corresponds to the left side of the image since the cameras were rotated 90°. The orange box illustrates a representative subset of size 101×101 $px^2$.

In order to perform the image correlation (i.e., matching of material points from $Cam_{633}$ to $Cam_{660}$), DIC requires a high-contrast pattern. Sometimes the natural surface of a test specimen is sufficient, but most often, a high-contrast pattern must be applied to the surface, with patterning methods limited only by the imagination. In the current example, small thickness variations in the phosphor coating provided intensity features in the images, as shown in FIG. 4. These features facilitated the use of DIC algorithms to correlate $Cam_{660}$ and $Cam_{633}$ images and identify the same material point in each image to sub-pixel precision (ca. 0.07 px, as described under Image Registration with Digital Image Correlation (DIC)).

The user-defined DIC parameters used in the correlation process are given in Table 2. To account for the varying image intensity between the two cameras and as a function of temperature, a normalized matching criterion (ZNSSD) was used. Recall that for local DIC, the correlation process is performed for each subset (small region of the image) individually. The general good practices for a DIC pattern are to have 3-5 high-contrast intensity features per subset, with each feature being 3-5 px in size. See International Digital Image Correlation Society (iDICs), *A Good Practices Guide for Digital Image Correlation* (2018). Using these guidelines, the subset size is then typically on the order of 21×21 $px^2$. Because the natural phosphor coating features did not form an ideal DIC pattern, a large subset of 101×101 $px^2$ was required. In an attempt to improve the DIC correlation, black dots or speckles were applied on top of the phosphor using either Sharpie marker or black paint, as seen in the top portion of the right strip of phosphor in FIG. 4. Unfortunately, these features led to erroneous intensity ratio measurements for pixels on the border of the features, as described under Temperature-vs-Intensity Ratio Calibration Curves. Alternatively, the phosphor pattern can be ameliorated to improve image registration with DIC algorithms, and the image processing code can be refined to eliminate the erroneous ratio measurements.

TABLE 2

Image processing parameters

| DIC Parameter | Value |
| --- | --- |
| Image prefiltering | 3 × 3 binomial |
| Subset size | 101 × 101 px$^2$ (4.7 × 4.7 mm$^2$) |
| Step size | 3 px (0.14 mm) |
| Subset shape function | Affine |
| Subset weighting | Gaussian |
| Interpolant | Optimized 8-tap |
| Reference image | Single, Undeformed Image |
| Matching criterion | ZNSSD |

Nonlinear Detector Corrections

Before the temperature-versus-intensity ratio calibration curves can be generated, nonlinearity and heterogeneity of the CMOS detectors must be corrected, so that the image intensity of each pixel is linearly proportional to the number of photons impinging upon the pixel. See T. Kissel et al., *Appl. Phys. B* 96(4), 731 (2009); V. Weber et al., *Appl. Phys. B* 103(2), 421 (2011); B. Fond et al., *Appl. Phys. B* 121(4), 495 (2015); and C. Abram et al., *Appl. Phys. B* 111, 155 (2013). Details of the nonlinear correction process are described below under Nonlinear Detector Correction and Image Noise. It is noted, though, that even small deviations from linearity of only 0.6% of the bit-depth of the image can lead to inferred temperature errors of up to 5° K if uncorrected; moreover, the inferred temperature can appear to depend on the image intensity. All intensity ratios presented here use corrected intensity values as described under Nonlinear Correction Strategy.

Intensity Ratio Calculation

After material points were mapped from Cam$_{660}$ to Cam$_{633}$ using DIC and corrected for detector nonlinearity, a Gaussian image pre-filter with a standard deviation of 1 px was applied to the images in order to reduce the image noise and precondition the image for intensity interpolation. Then, intensities were interpolated to sub-pixel locations using a cubic spline. Next, the intensity ratio, I$_r$, was computed as:

$$I_r = \frac{I_{633}}{I_{660}} \quad (1)$$

where I$_{633}$ and I$_{660}$ are the interpolated, sub-pixel image intensities from Cam$_{633}$ and Cam$_{660}$, respectively. Points with an intensity less than 104 (on a 16-bit scale) were considered background and were removed. The ratios were computed for each stereo image pair individually, in the series of 75-90 images that were captured as the phosphor calibration sample was swept through the field-of-view at each temperature. Then, the intensity ratios from all the images within a single temperature step were interpolated to whole-pixel increments and averaged on a pixel-wise basis. Thus, the final output of the ratio calculation process was a matrix of intensity ratio values at pixel-wise locations across the entire field-of-view for each of the six temperature steps.

Image Registration with Digital Image Correlation (DIC)

A novel feature of the present invention is the synergistic combination of phosphor thermography and DIC. By using DIC algorithms for image registration, (a) precision of full-field phosphor thermography measurements on static test articles is improved, and (b) a foundation is laid for applying the ratio method for full-field temperature measurements on dynamic and deforming test specimens. For example, the methodology can be used for combined thermo-mechanical testing, where both sample temperature and strain are quantities-of-interest, as described in the Example below.

As one example from previous literature, Abram et al. viewed the test article (a plane of a fluid seeded with phosphor particles) using two cameras oriented 90 deg. from each other, with a dichroic beam splitter projecting the test article image onto each camera. See C. Abram et al., *Prog. Energ. Combust.* 64, 93 (2018). They performed image registration by physically adjusting the placement of one of the cameras until the relative displacement field between the two images was minimized to approximately 0.15-0.25 px. Remaining error was attributed to beam-splitter distortions. As another example, Fuhrmann et al. employed two cameras viewing the test article at a stereo angle, and then used a pinhole camera model to register the two images to within 0.06 px. See N. Fuhrmann et al., *Proc. Combust. Inst.* 34(2), 3611 (2013). However, Fuhrmann limited the analysis to the center 15×15 px$^2$ of the detector and did not treat spatial lens distortions or the aperture effect.

In the present invention, a thorough calibration process can be used to obtain the both the extrinsic and intrinsic parameters—including a model for lens distortions—of the stereoscopic imaging system (see Table 1). Moreover, the DIC correlation algorithms are used to track material points while the test specimen moved through the field-of-view. Together, these DIC techniques led to an epipolar error of 0.03-0.10 px (0.07 px on average), which is a measure of accuracy for both the matching between the stereo image pairs, as well as the matching of images over time as the specimen was moved through the field-of-view. This matching precision is better than that obtained by Abram et al. and on par with that obtained by Fuhrmann but here over the majority of the field-of-view (1920×400 px$^2$) instead only the center 15×15 px$^2$.

Flat-Field Corrections and Spatial Non-Uniformities

Figure 5:
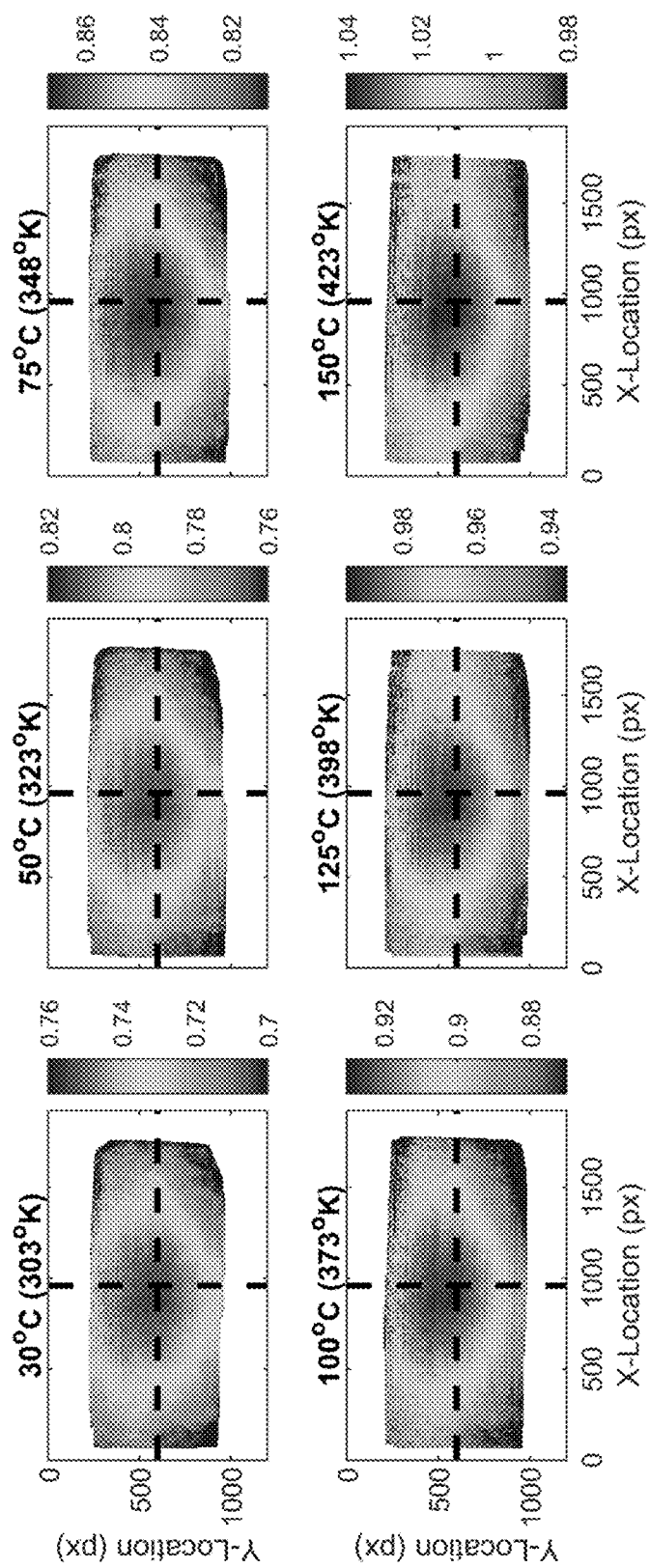
FIG. 5 shows contour plots of mean intensity ratio, $I_r$, calculated during the in situ phosphor calibration. Note that the color bar ranges are adjusted for each temperature individually to highlight the spatial variation across the field-of-view.

The full-field contour plots of the intensity ratio from the in situ phosphor calibration are shown in FIG. 5. In general, the intensity ratio of I$_r$=I$_{633}$/I$_{660}$ increases with increasing temperature as expected based on the fundamental thermographic phosphorescence behavior described above and illustrated in FIG. 1. Unexpectedly, though, the intensity ratio varied across the field-of-view of the camera.

Figure 6:
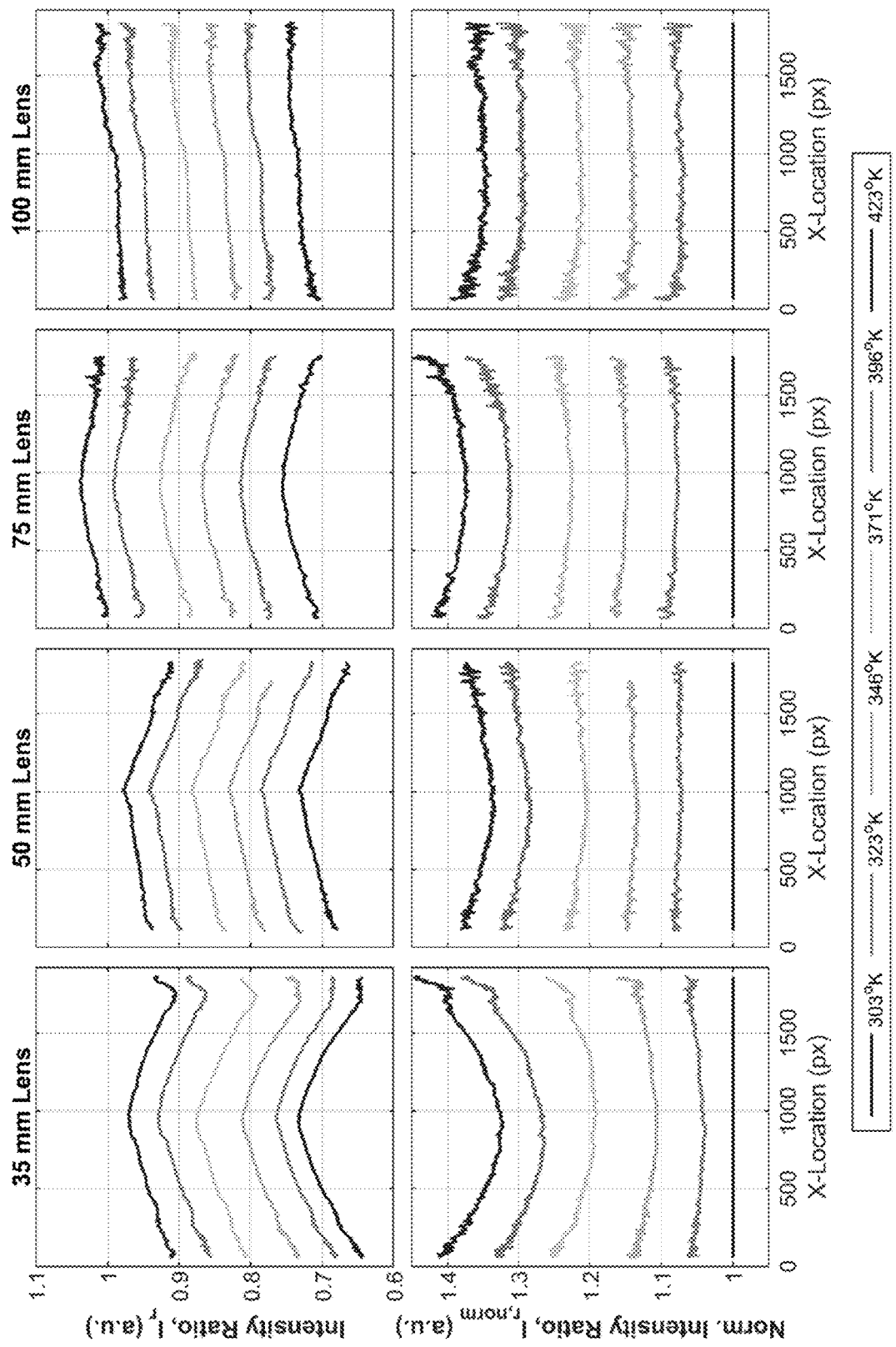
FIG. 6 shows line scans of intensity ratios extracted at the horizontal centerline of the image (Y=600 px) for consistent CMOS detectors and fields-of-view, and varying mounted lenses and stand-off distances. Top row: Raw intensity ratio, $I_r = I_{633}/I_{660}$. Bottom row: Normalized intensity ratio, $I_{r,norm} = I_r / I_{r|T=303°K}$.

To explore this spatial non-uniformity further, the phosphor calibration was repeated using a bench-top setup with additional lenses, three from the Edmund Optics DG Fixed Focal Length Lens series (focal lengths of f=[35, 50, 75] mm) and a Tokina AT-X Pro Macro lens with focal length of f=100 mm. The stand-off distance was adjusted for each lens in order to maintain approximately the same field-of-view and image scale. The horizontal centerline (Y=600 px) of the intensity ratio, I$_r$, for each lens is shown in FIG. 6 (top row). The spatial distributions are more severe with decreasing focal length within the Edmund Optics series. The Tokina 100 mm lens has the least spatial distortion, which may be the product of the increased focal length, increased stand-off distance, and/or different lens manufacturing.

Typically, a flat-field correction is applied to account for non-uniform collection efficiencies that differ between the two imaging systems (i.e. $Cam_{633}$ and $Cam_{660}$), and to remove the spatial non-uniformity of the intensity ratio that is observed in FIG. 5 and FIG. 6 (top row). To apply a flat-field correction, the intensity ratio for all temperatures was divided on a point-by-point basis by the ratio at room temperature:

$$I_{r,norm}(X, Y, T) = \frac{I_r(X, Y, T)}{I_r(X, Y, T)|T = 303°K} \quad (2)$$

where $I_{r,norm}$ is the flat-field corrected (normalized) intensity ratio, (X, Y) are the pixel coordinates in the image, and T is the sample temperature.

The horizontal centerline (Y=600 px) of the normalized intensity ratio, $I_{r,norm}$, for each lens is shown in FIG. 6 (bottom row). The normalized intensity ratio at room temperature (303° K) is uniquely 1 by definition. For the 100 mm Tokina lens, the flat field correction worked as intended, and the small slope observed in the unnormalized intensity ratio is predominately removed for all temperatures. However, the flat-field correction failed for the three Edmund Optics lenses, where the spatial non-uniformity returned and increased in magnitude with increasing temperature.

The temperature-dependent spatial non-uniformity may be caused by two effects, and/or the combination thereof. The first is a blue-shift effect of the bandpass filters for uncollimated light. When the angle-of-incidence of light rays onto interference bandpass filters is non-zero, the filter effectively shifts the light to lower wavelengths, following Eqn. 3 for small angles:

$$\lambda_b = \lambda_0 \left[1 - \left(\frac{n_0}{n_f}\right)^2 \sin^2(\alpha)\right]^{1/2} \quad (3)$$

where $\lambda_b$ is the wavelength of the blue-shifted light, $\lambda_0$ is the wavelength of the incident light (either 633 nm±10 nm or 660 nm±5 nm), $n_0$ is the index of refraction of the medium through which the light is traveling ($n_0$=1 for air), of is the effective index of refraction of the filter, and $\alpha$ is the angle-of-incidence with respect to the filter normal. The angle-of-incidence is greater towards the edge of the filter (and thus the edge of the image) compared to the center, which could explain the curvature of the contour plots in FIG. 5 and the line scans in FIG. 6. In the present setup, the stand-off distance was increased as the lens focal length was increased to maintain the same field-of-view; thus, the angle-of-incidence was decreased and the light approached collimation for the longer focal-length lenses. This could explain why the curvature of the line scans is lower for the longer focal length lenses. Lastly, the temperature-dependent change in the curvature could be caused by a combination of the blue-shift effect of the filter along with the red-shift of the phosphor emission as the temperature increases, as shown in FIG. 1.

The second effect is a wavelength-dependent and position-dependent transmission efficiency of the lens. The specification sheets for the Edmund Optics lenses show a position-dependent decrease in the relative illumination or transmission efficiency of the lens as one moves from the center towards the edge of the lens. Additionally, they show a wavelength-dependence of the spatial distortion, i.e. a combination of barrel distortion and lateral chromatic aberration. Combining these two reported lens characteristics, it is reasonable to propose that the transmission efficiency is also wavelength-dependent.

Therefore, the red-shift of the phosphor emission, shown in FIG. 1, together with a (proposed) wavelength- and spatial-dependent lens transmission efficiency could lead to the temperature-dependent spatial non-uniformities of the intensity ratio observed here. Moreover, according to the lens manufacturer's data, both the spatially-dependent reduction in transmission efficiency and the wavelength dependence of the barrel distortion are more pronounced for the 35 mm lens compared to the 75 mm lens; this is consistent with the observation that the spatial non-uniformity of the intensity ratio is more pronounced for the 35 mm lens compared to the 75 mm lens.

Both of these possible effects require further investigation to prove. Regarding the blue-shift effect of the filter, a preliminary experiment was performed where the light emitted by the phosphor was collimated before passing it through the bandpass filters. Unfortunately, this did not remove the spatial non-uniformities of the intensity ratio. Regarding the lens transmissivity, the wavelength dependence for the lenses can be characterized experimentally. An optical model can be developed to account for both effects. An alternative phosphor calibration method is described below to account for these spatial nonuniform ities, for the case where the standard flat-field correction is not sufficient to remove them.

Temperature-vs-Intensity Ratio Calibration Curves

Figure 7B:
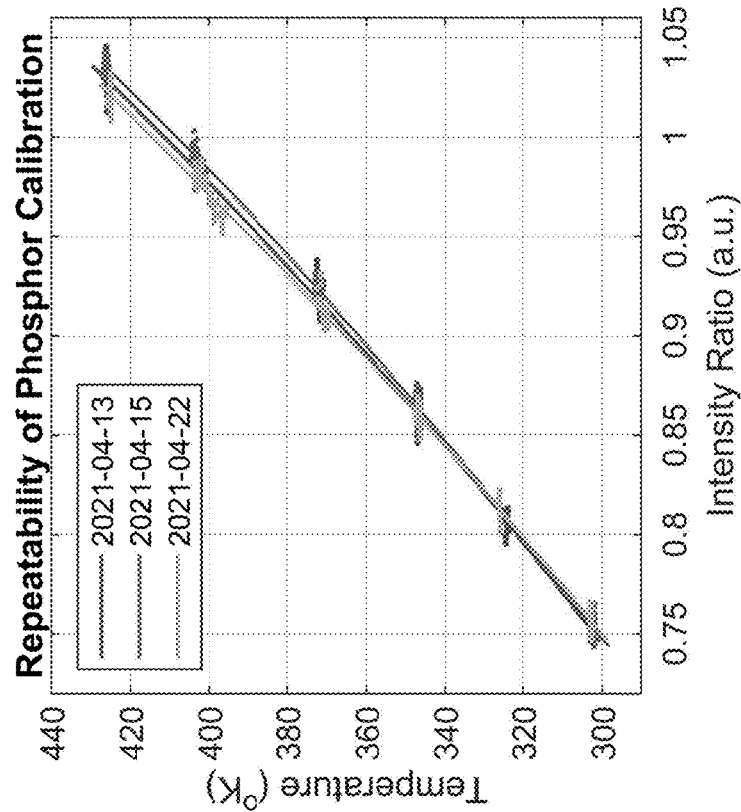
FIG. 7B is a graph of curves for the center pixel of the detector (X=1001 px, Y=600 px), for calibrations performed on three separate dates with no adjustments to the experimental setup.
Figure 7A:
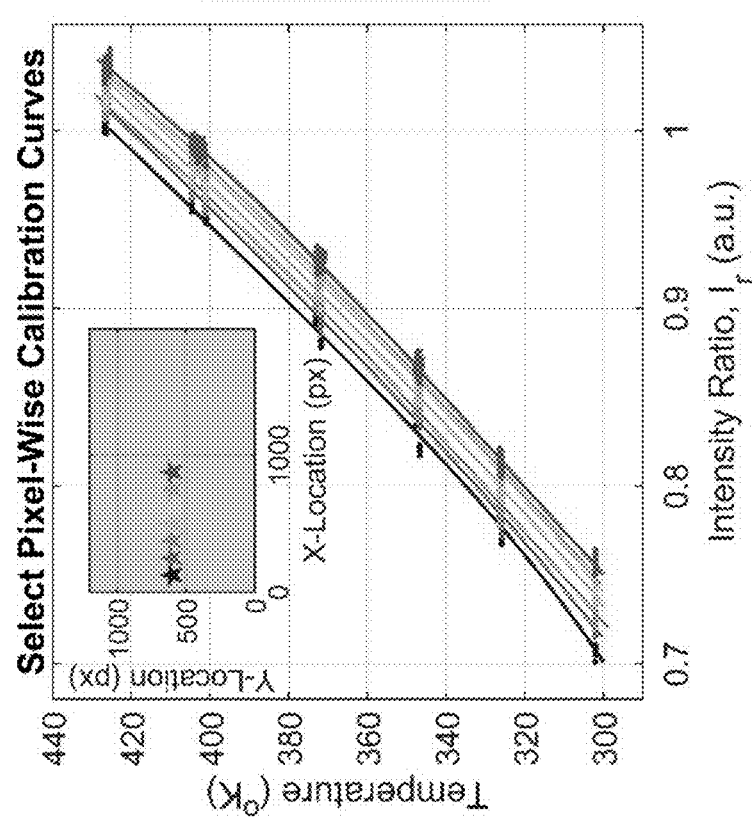
FIG. 7A is a graph of representative pixel-wise calibration curves between computed intensity ratio, $I_r$, and temperature, utilizing a cubic polynomial fit. Curves are shown for a single calibration (performed on 2021 Apr. 15) for select pixels along the horizontal centerline (Y=600 px), with the X-location along the detector illustrated by the inset.

Because a traditional flat-field correction was insufficient to eliminate the temperature dependent spatial non-uniformities of the intensity ratio (FIG. 6, bottom row), a different approach was employed to create the calibration curve. Specifically, cubic polynomials were fit on a pixel-by-pixel basis to the temperature-vs-intensity ratio data. FIG. 7A shows representative curves from a single calibration performed on one day, for pixels along the horizontal center line (Y=600 px), moving from the left to the center of the image. The different curves highlight the spatial non-uniformity. FIG. 7B shows the calibration curves from the center of the detector (X=1001 px, Y=600 px) for three calibrations performed on three different days. The calibration curves generated on different days are in good agreement, suggesting that a single calibration can be applied to all tests employing a constant experimental configuration. These curves represent the final calibration necessary to infer temperature from computed intensity ratio. Key points regarding the calibration curves include the following:

Because the phosphor calibration process was performed in situ, these curves include effects of the experimental geometry. As long as the equipment is not altered between the phosphor calibration and the test (e.g. camera position and angle, and lens aperture and focus remain the same), the intensity ratio at a given temperature will be unaltered.

Because the image intensities were corrected for detector nonlinearity before the intensity ratio was computed, these curves represent the ratio of the actual photon emission from the phosphor from the two wavelength bands. Note that test images must also be corrected for detector nonlinearity using the same procedures as was used for the calibration images, before computing the intensity ratio and applying these calibration curves to infer temperatures of the test article.

Because the curves were computed on a pixel-wise basis, they treat the temperature dependent spatial non-uniformities that are not able to be corrected by standard flat-field corrections. By using these pixel-wise calibration curves, the true spatial distribution of the temperature field will be measured, without being convolved with bias errors from the lens.

Because stereo-DIC was used for image registration, these pixel-wise calibration curves were generated for an entire 3D volume, allowing full-field temperature measurements on a moving/deforming test article.

Figure 8:
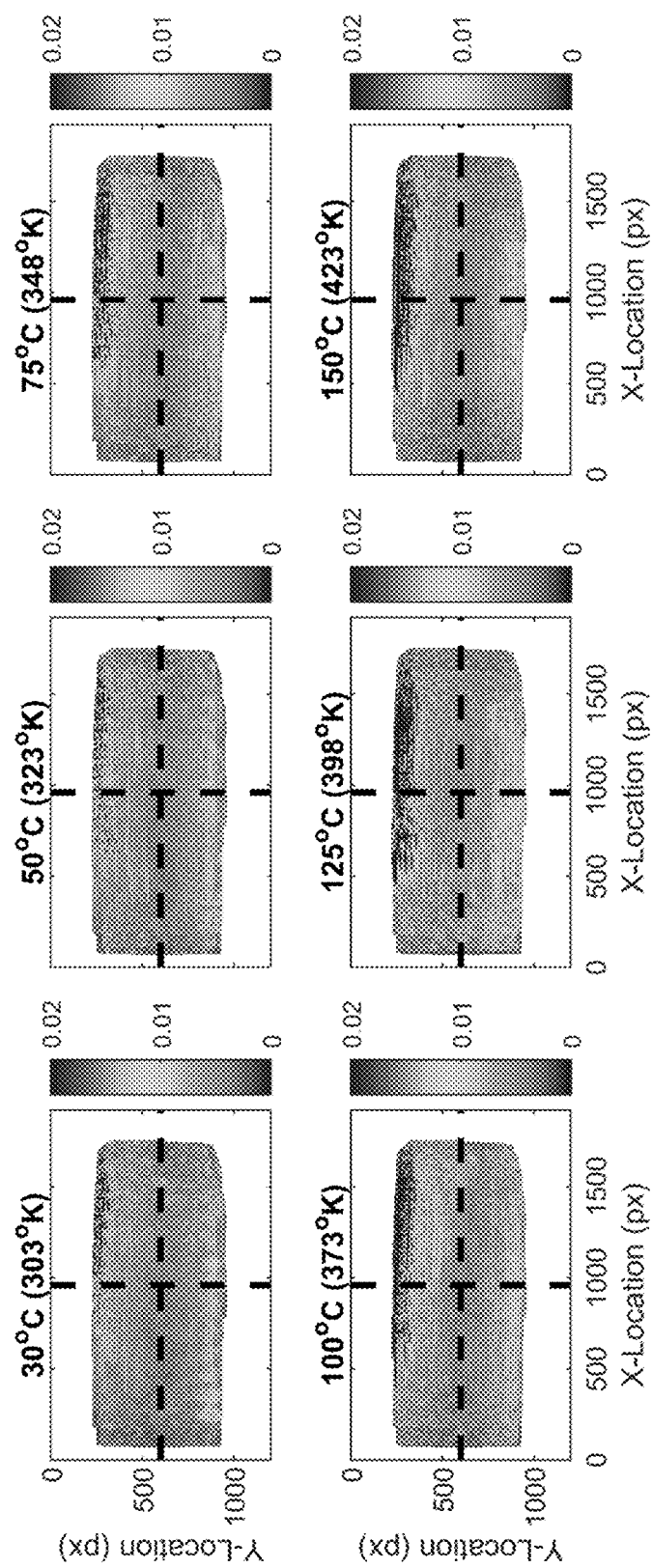
FIG. 8 shows contour plots of standard deviation of the intensity ratio, $I_r$, calculated during the in situ phosphor calibration.

At a given temperature, there is some variation in the computed intensity ratio, as seen by the horizontal scatter in the data points at each temperature in FIGS. 7A and 7B. Each data point represents a different image captured while the phosphor calibration sample was swept between the grips and through the field-of-view of the cameras. This variation is attributed to image noise, which is discussed further in the section titled Nonlinear Detector Correction and Image Noise. To quantify this uncertainty in the input data for the calibration curves more closely, FIG. 8 presents contours of the standard deviation of the pixel-wise intensity ratios computed at each temperature. In the horizontal center of the image (400<Y<800 px), which is the main area-of-interest for the ultimate application, the mean of the standard deviation of the ratio ranges between and 0.0058 for the six different temperatures. The variation is larger at the top of the field-of-view (Y<370 px), which is caused by erroneously computed ratios for pixels on the border of the black DIC features on the right strip of the phosphor calibration sample. For this example, the relevant area-of-interest for the ultimate application only utilized pixels in the center of the image (400<Y<800 px), unaffected by the erroneous ratio measurements. A phosphor pattern tailored for DIC can be employed which would remove this error.

Figure 9:
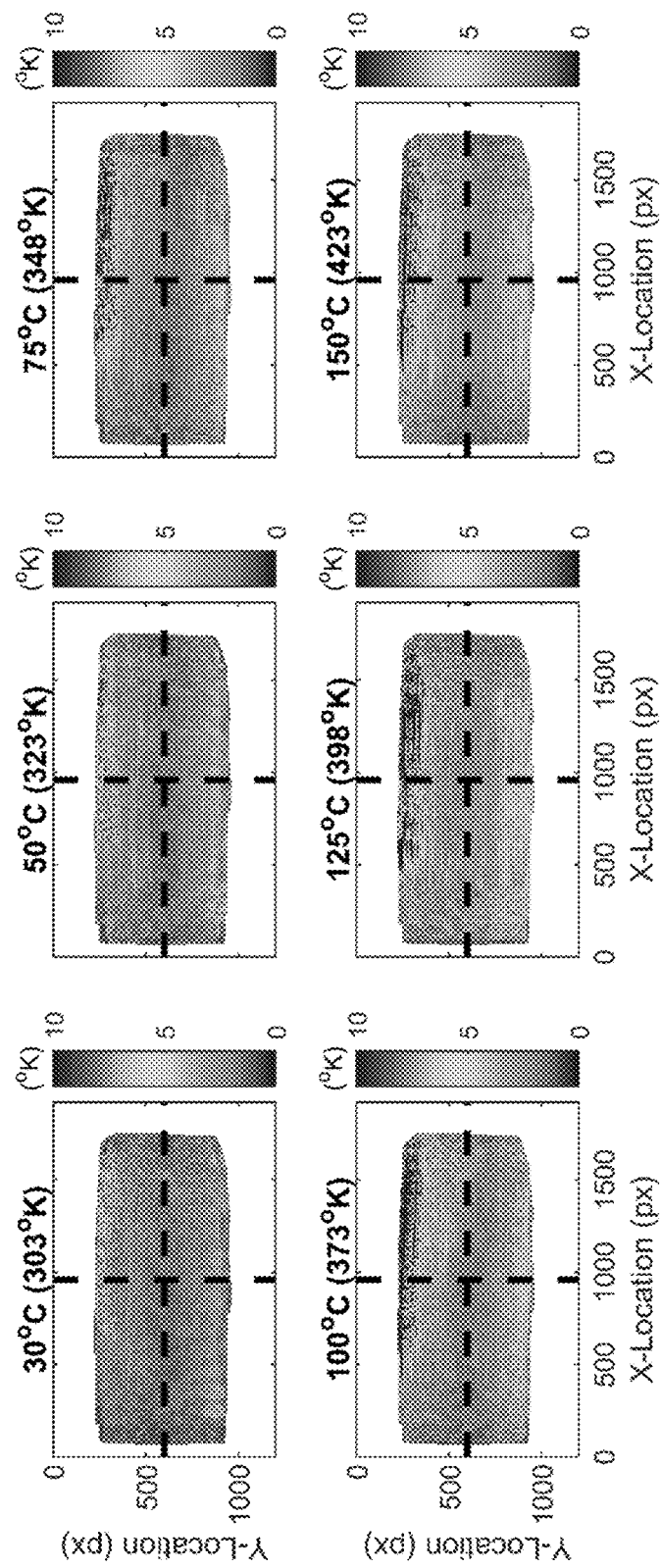
FIG. 9 shows contour plots of standard deviation of inferred sample temperature when utilizing the in situ phosphor two-color ratio method thermography calibration.

To estimate the anticipated inherent error in the inferred temperatures, the intensity ratios were processed through the calibration curves. Contours of the resulting temperature standard deviation are shown in FIG. 9. Restricting the analysis to the center region of the image (400<Y<800 px), the mean of the standard deviation of the temperature is less than 3° K for all temperatures. This value represents the noise-equivalent differential temperature (NEDT) for the phosphor thermography measurements and is thus the lower bound for error in an application.

Effects of Excitation Fluence

Figure 10:
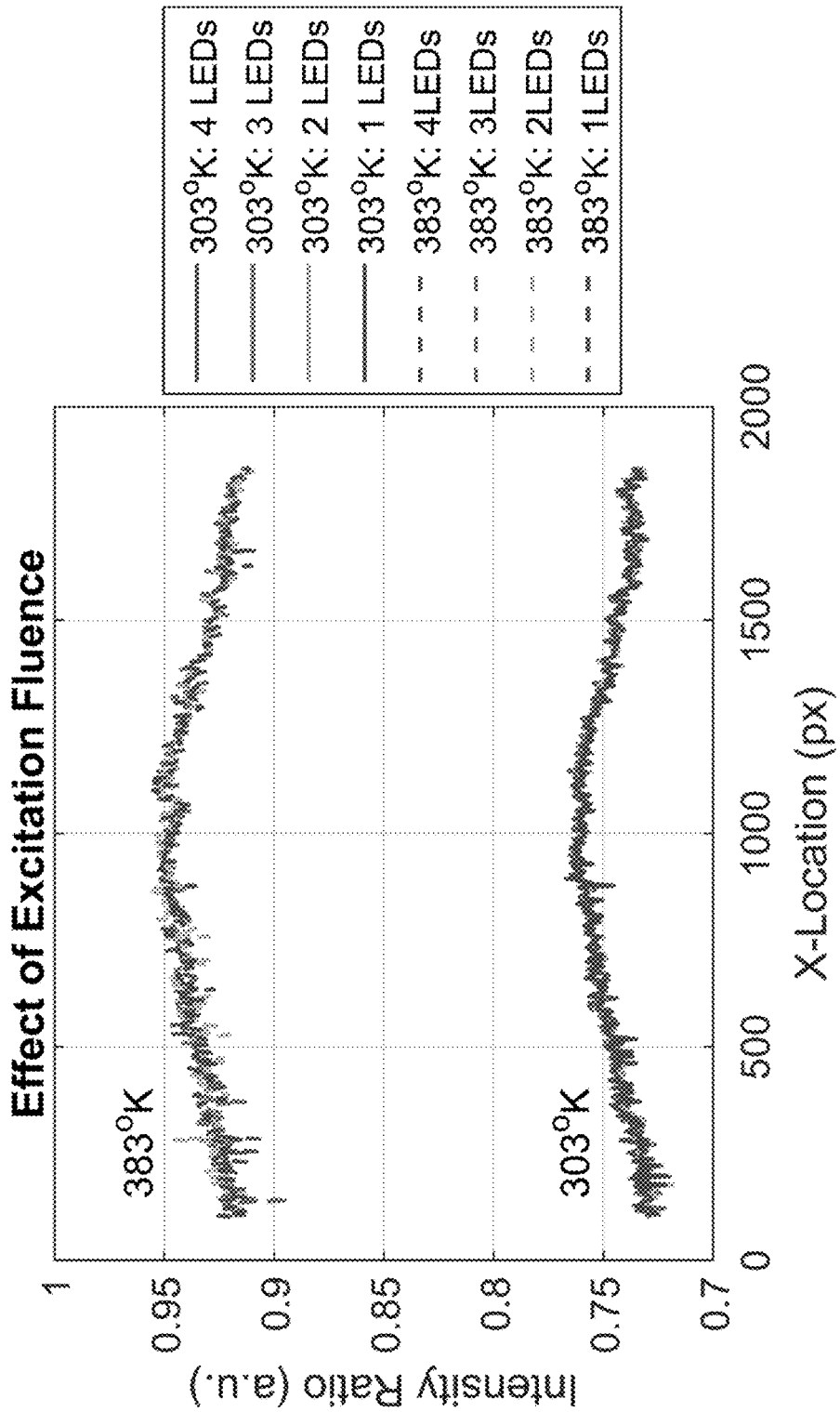
FIG. 10 is a graph of computed intensity ratio, $I_r$, along the detector centerline (Y=600 px) at two temperatures (303° K and 383° K), with different excitation fluence levels (indicated by the number of overlapping LEDs).

A concern in applying the ratio method is the potential dependence of the computed intensity ratio on the excitation fluence, which has been noted in the past literature. See J. Brubach et al., *Prog. Energ. Combust.* 39(1), 37 (2013); B. Fond et al., *Appl. Phys. B* 121(4), 495 (2015); and J. Brubach et al., *Meas. Sci. Technol.* 19(2), 1 (2008). To invalidate this hypothesis, the phosphor calibration sample was illuminated on a bench-top setup with either 1, 2, 3, or 4 of the overlapping UV LED lamps, to vary the excitation fluence by approximately doubling, tripling, and quadrupling it. The centerline computed intensity ratio is shown in FIG. 10 at two different temperatures. The intensity ratio was found to be independent of the number of UV LEDs used for excitation, and therefore, independent of excitation fluence within the range of fluences expected. (Note, however, that this independence should not be extrapolated to other fluence ranges, for example, when an ND-YAG laser is used as the excitation source.) This result relaxed the requirements for homogeneous LED overlap across the region-of-interest for the experimental setup.

Nonlinear Detector Correction and Image Noise

The theoretical derivation of detector nonlinearity characterization is described below, then the experimental characterization of the CMOS detectors used, next the application of the correction data to test images, and finally results for the effects of correction strategy and image noise on the intensity ratio.

Theoretical Derivation of Detector Nonlinearity Characterization

The following derivation closely follows Weber et al. and is included here for completeness. See V. Weber et al., *Appl. Phys. B* 103(2), 421 (2011). The grey-level intensity value of a pixel on a CMOS detector, G, can be written as:

$$G = G_o + f(N_e) \quad (4)$$

where $G_o$ is the offset value at zero irradiance (i.e. the grey-level intensity of a black reference image), $N_e$ is the number of electrons output by the detector, and f is a function, potentially nonlinear and spatially inhomogeneous pixel-to-pixel, that describes the conversion factor from electrons to grey-level intensity value.

The number of electrons is assumed to be proportional to the number of photons that impinge on the pixel, and can be computed by:

$$N_e = \frac{At_{exp}}{hc} \int_{\lambda_2}^{\lambda_1} \eta(\lambda) \lambda E_\lambda(\lambda) d\lambda \quad (5)$$

where A is the light sensitive area of a pixel, $t_{exp}$ is the exposure time, $h = 6.62607015 \times 10^{-34}$ J·s is Plank's constant, $c = 2.99792458 \times 10^8$ m/s is the speed of light, $\eta$ is the wavelength-dependent quantum efficiency of the detector, $\lambda$ is the wavelength of light, and $E_\lambda$ is the incoming irradiance of a broadband light source.

For simplicity, constant values can be grouped together into a single constant, P, and Eqn. 5 can be rewritten as:

$$N_e = PT_{exp} \quad (6)$$

with $$P = \frac{A}{hc} \int_{\lambda_2}^{\lambda_1} \eta(\lambda) \lambda E_\lambda(\lambda) d\lambda \quad (7)$$

As described below, the number of photons impinging on the pixels was varied (and thus the number of electrons generated by the detector) by varying the exposure time of the images while keeping the irradiance constant. Thus, exposure time was used as a proxy for the number of generated electrons. To emphasize this relationship, a new variable can be defined, $N^*_e \equiv t_{exp}$, and Eqn. 4 can be rewritten as:

$$G = G_o + g(N^*_e) \quad (8)$$

where g is the new conversion factor function.

Experimental Characterization of Detector Nonlinearity and Image Noise

Figures 11A, 11B:
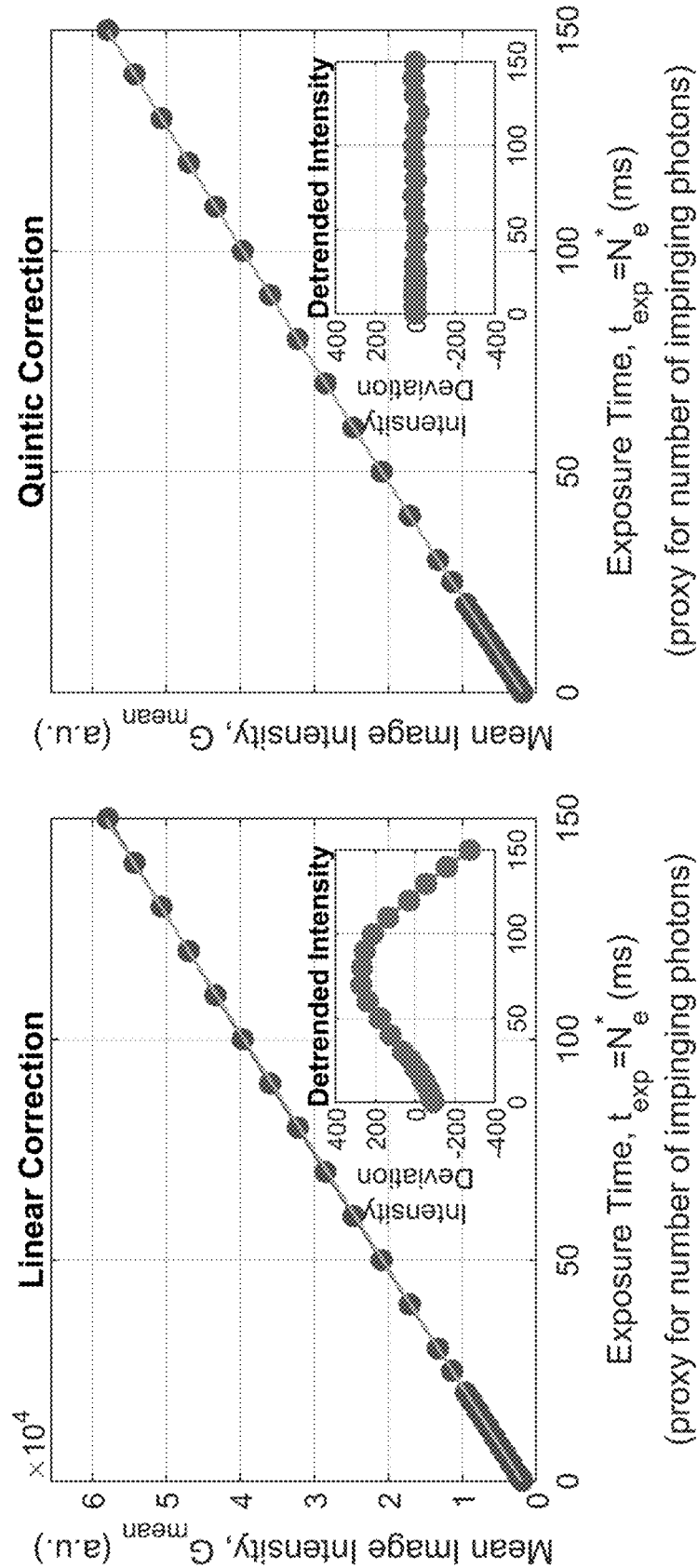
FIGS. 11A and 11B show the mean intensity of all pixels on the detector as a function of the exposure time (blue dots connected by a blue line), with either a linear trend fit (yellow line, FIG. 11A) or a quintic trend fit (yellow line, FIG. 11B). The quintic trend fits the data nearly perfectly, such that the blue line is directly underneath the yellow line. The deviations between the fits and data are shown in the insets in red.

The nonlinear detector behavior was evaluated using a white-light source (Thorlabs, Stabilized Tungsten-Halogen Light Source, $\lambda_I$=360-2600 nm) coupled to an integrating sphere, to generate steady (after at least 4 hours of warm-up) and uniform light onto the detector. The exposure time of the detector, $t_{exp}=N^*_e$, was varied to control the number of photons impinging on each pixel and thus the number of electrons generated by each pixel, $N_e$. Ten images were captured at each exposure setting and averaged together to reduce image noise. This process was repeated for each bare detector and each detector/lens/filter combination. FIG. 11A shows the results from one detector/lens/filter combination used, where the mean image intensity, $G_{mean}$, is presented as a function of the exposure time, $t_{exp}=N^*_e$.

The pixel response to photon impingement (blue dots) in FIG. 11A looks linear at first, but when fit with a linear trend (yellow line), the resulting detrended intensities (red curve in inset) show a mismatch. While this deviation between the linear fit and the data is small—less than 400 counts on a 16-bit scale, or of the image dynamic range—it has a noticeable effect on the computed intensity ratios, as shown in Dependence of Intensity Ratio on Nonlinearity and Image Noise. The order of the polynomial was increased until, with a quintic polynomial, the intensity deviation of the detrended intensity was essentially zero, as shown in FIG. 11B. Similar results were obtained with either the bare detector or the filter/lens/detector combination, indicating that the nonlinearity is a function of only the detector.

Figure 12:
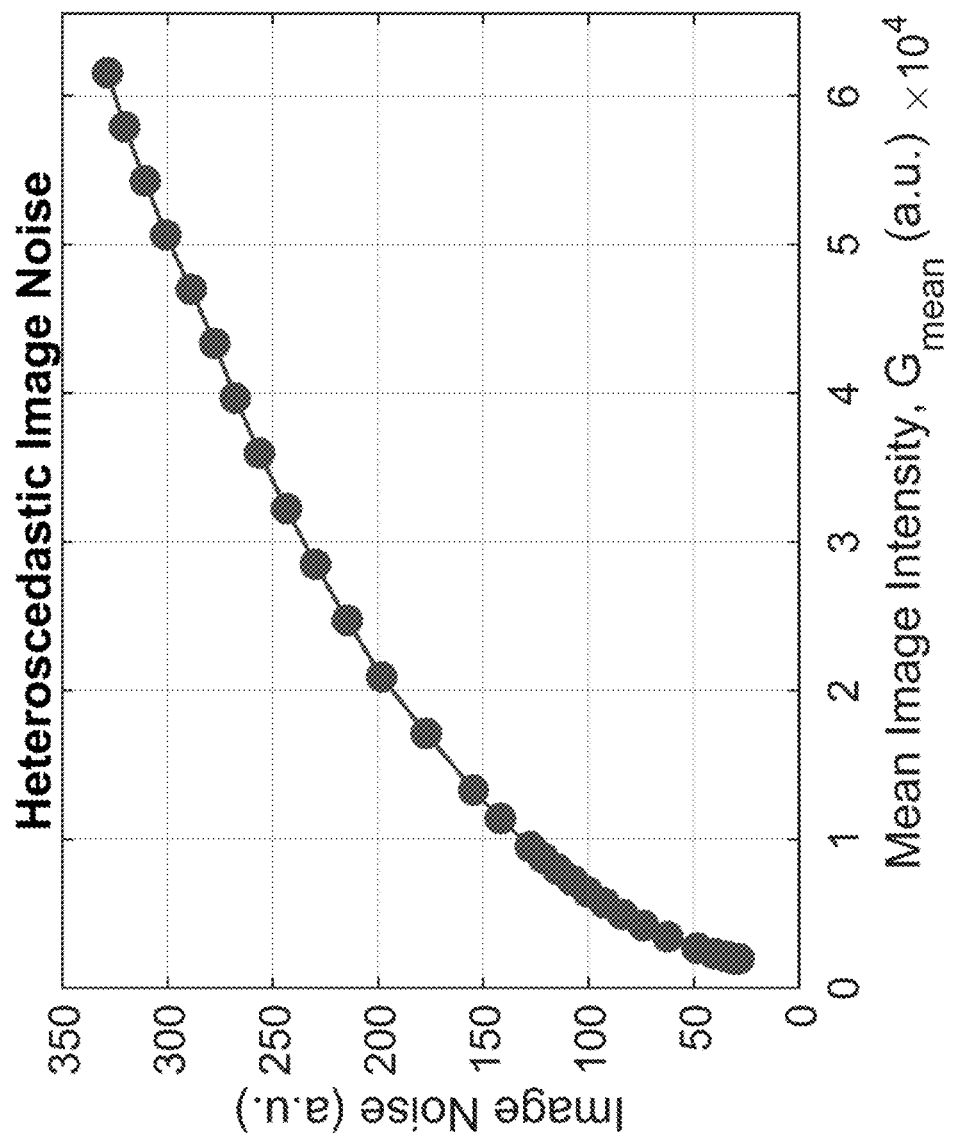
FIG. 12 is a graph of heteroscedastic image noise profile for one of the CMOS detectors.

Using the same image set, the heteroscedastic image noise was also characterized. The standard deviation of image intensity computed over 10 repeat shots is presented as a function of the mean image intensity in FIG. 12. The image noise is lower for darker pixels and increases for lighter/whiter pixels, as expected. Notably, the maximum image noise of ca. 325 counts (on a 16-bit scale) is on the same order as the detector nonlinearity, as shown by the intensity deviation from the linear fit in FIG. 11A (detrended intensity, inset). The effect of image noise on the intensity ratio is also shown in the section titled Dependence of Intensity Ratio on Nonlinearity and Image Noise.

Nonlinear Correction Strategy

The first step to developing a correction strategy was to invert the dependent and independent variables in Eqn. 8. Additionally, in order to make a polynomial fit to experimental data (FIGS. 11A and 11B) better posed, the image intensity was normalized by the bit-depth of the image, b ($b=2^{16}$ for the 16-bit images used). Taken together, the inverse of Eqn. 8 becomes:

$$N^*_e = h^*(G^*) \tag{9}$$

with $$G^* = \frac{G - G_o}{b} \tag{10}$$

where $h^*$ is the inverse of the conversion factor, and $G^*$ is the pixel intensity after subtracting the black reference value and normalizing by the bit-depth of the image.

Since a quintic polynomial was found to accurately describe the behavior of our detectors (as shown in FIG. 11B), Eqn. 9 can be expanded as:

$$N^*_{e,5} = p_0 + p_1 G^* + p_2 (G^*)^2 + p_3 (G^*)^3 + p_4 (G^*)^4 + p_5 (G^*)^5 \tag{11}$$

and the parameters $p_0$ through $p_5$ are determined via a least-squares fit to the tungsten lamp data. While the mean intensity, $G_{mean}$, is show in FIG. 11B, this fit was actually performed on each pixel individually to account for slight pixel-to-pixel heterogeneity.

Once the fit parameters, $p_i$, were determined from the tungsten lamp data for each pixel, then the intensity of the phosphor images was corrected by applying Eqn. 11, where $G^*$ was computed from the phosphor image. Through this operation the computed value of $N^*_e$ is now linearly proportional to the number of photons that actually impinged on the pixel, and $N^*_e$ (rather than the uncorrected grey-level intensity G) was used for all image intensity ratios for the phosphor ratio method.

Dependence of Intensity Ratio on Nonlinearity and Image Noise

Figure 13:
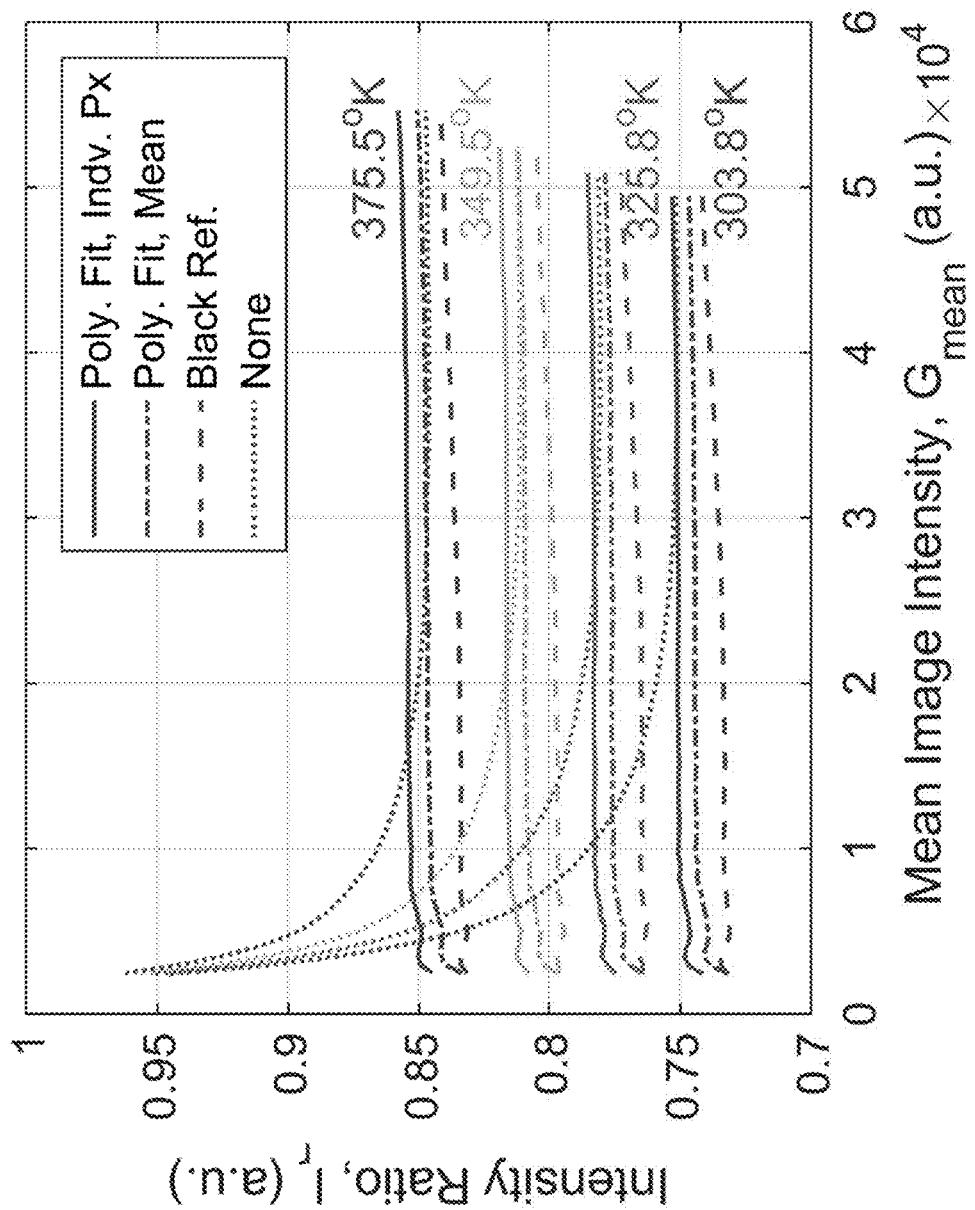
FIG. 13 is a graph of the computed intensity ratio, $I_r$, at four temperatures as a function of the mean image intensity with: no corrections, background subtraction only, a quintic correction curve generated from the mean pixel intensity of the tungsten lamp images, and a pixel-wise quintic correction. The intensity ratio is the mean computed over a 50×50 $pixel^2$ region in the center of one of the strips of the phosphor calibration sample, where the ratio was spatially uniform.

If the detector nonlinearity correction is not performed, then the intensity ratio can falsely appear to be dependent on the pixel intensity. FIG. 13 shows the effect of the image intensity (controlled via exposure time) on the computed intensity ratio when four different image correction strategies were applied. This data was collected using the phosphor calibration sample on a bench-top setup that mimics the one shown in FIG. 2 but with a slightly different geometric setup.

First, no correction was applied, meaning the intensity ratio was computed from the raw image intensities, G. With no corrections, a significant variation in computed intensity ratio occurs at lower image intensities, where the black reference intensity value, $G_0$, is a significant portion of the image intensity, G.

Next, the black reference value was subtracted from the image intensity and computed the intensity ratio from (G–$G_0$), as is standard procedure for phosphor thermography. When only a black reference correction is applied, the dependence of the intensity ratio on the mean image intensity is greatly reduced, as expected; however, the computed intensity ratio still varies proportional to mean image intensity.

Finally, the quintic correction described above was applied and computed the intensity ratio from $N^*_{e,5}$. Two versions were investigated, where the values of the quintic polynomial, $p_i$, were computed from either the mean tungsten lamp image intensity data or from individual pixels. Both corrections reduced the dependence, with the latter providing the most stable intensity ratio.

The intensity ratios at a mean image intensity of 15,000 and 45,000 counts were extracted from the data in FIG. 13. The difference in the intensity ratio between these two mean intensity values is quantified in Table 3. The resulting error in temperature (estimated from an approximate, linear temperature-versus-intensity ratio calibration curve) is also tabulated. If no correction is applied, an unacceptably large error for all temperatures of 5° K to over 12° K occurs. If the black reference correction is applied, a temperature error of 4-5° K remains. Finally, both the mean and pixel-wise quintic corrections reduce overall temperature error to ≤2° K.

Figure 14:
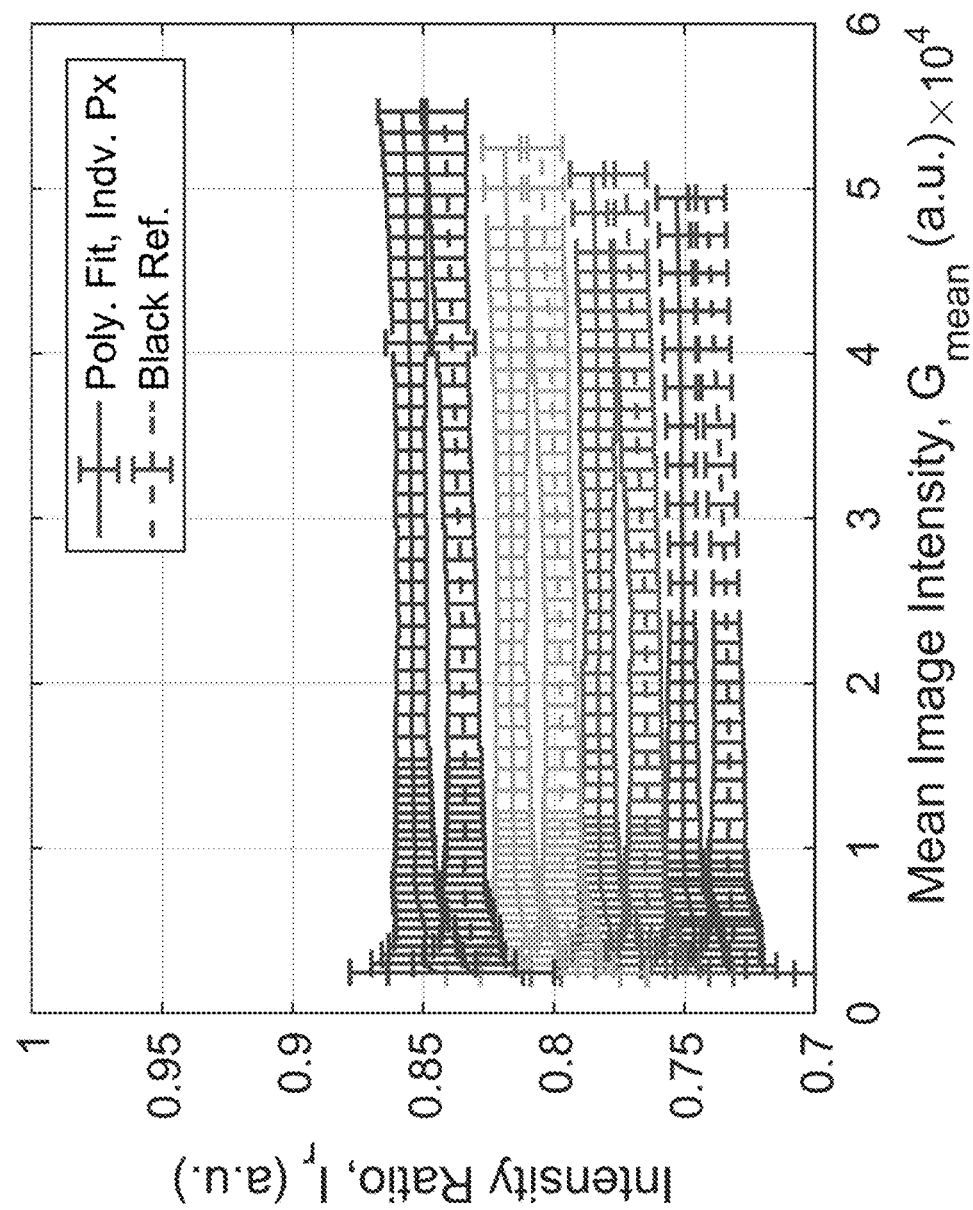
FIG. 14 is a graph of the computed intensity ratio, $I_r$, at four temperatures as a function of the mean image intensity with: background subtraction only, or a pixel-wise quintic correction. The intensity ratio is the mean computed over a 50×50 $pixel^2$ region in the center of one of the strips of the phosphor calibration sample where the ratio was spatially uniform, with error bars representing the standard deviation of the same region. Colors correspond to four temperatures, as labeled in FIG. 13.

FIG. 13 and Table 3 both show the effect of the detector nonlinearity on the mean intensity ratio, and thus represent bias errors. Importantly, variance errors caused by image noise are were also computed. FIG. 14 shows standard deviation (indicated by the error bars) of the intensity ratio over the same region-of-interest; for clarity, only two of the four correction strategies are shown. Note that the region-of-interest over which the standard deviation was computed was small (50×50 px$^2$) and at the center of the image, where the spatial non-uniformities discussed previously are not a concern and the variance can be attributed to image noise. The variance error in the intensity ratio at 30,000 counts of image intensity is approximately 0.0056 for all four correction strategies and all four temperatures. This variance error is slightly less than the bias error presented in Table 3 for the black reference correction strategy (ca. 0.0065) and is significantly higher than the bias error for either of the quintic polynomial correction strategies (ca. 0.0010-0.0025).

In summary, the quintic polynomial correction strategies successfully reduced bias errors caused by detector nonlinearity to a negligible amount. Remaining variance errors from image noise then dominated the overall phosphor two-color ratio-method thermography precision. For all results described above, the pixel-wise quintic polynomial correction strategy was applied.

TABLE 3

The difference in intensity ratio, $I_r$, and resulting difference in temperature, as the mean image intensity changes from 15,000 to 45,000 counts. Errors are presented at four temperatures with four correction strategies: no corrections, background subtraction only, a quintic correction curve generated from the mean pixel intensity of the tungsten lamp images, and a pixel-wise quintic correction.

| Correction Strategy | 303.8° K | 325.8° K | 349.5° K | 375.5° K |
|---|---|---|---|---|
| | Difference in Intensity Ratio | | | |
| Poly. Fit, Indv. Px. | 0.0006 | 0.0017 | 0.0025 | 0.0025 |
| Poly. Fit, Mean | 0.0008 | 0.0019 | 0.0027 | 0.0026 |
| Black Reference | 0.0062 | 0.0068 | 0.0070 | 0.0062 |
| None | 0.0164 | 0.0140 | 0.0111 | 0.0084 |
| | Difference in Temperature (° K) | | | |
| Poly. Fit, Indv. Px. | 0.4 | 1.2 | 1.7 | 1.7 |
| Poly. Fit, Mean | 0.6 | 1.3 | 1.9 | 1.8 |
| Black Reference | 4.4 | 4.8 | 5.0 | 4.4 |
| None | 12.4 | 10.6 | 8.4 | 6.4 |

Example: Simultaneous Measurements of Strain and Surface Temperature Using TP+DIC Many applications in combined environments require simultaneous temperature and deformation measurements of a test specimen. Instrumentation gauges, like thermocouples (TCs) or strain gauges, have been used historically to provide point measurements of boundary conditions and system response. However, these physical gauges provide only limited data, are prone to errors from electrical interference, may suffer from poor contact adhesion, and can be intrusive to the system under study by changing its thermal and/or mechanical behavior.

Non-contact diagnostics afford solutions to the challenges posed in instrumenting a test specimen. Digital image correlation (DIC) is a well-established optical technique providing full-field shape, displacement and strains on the surface of a test specimen, a vast improvement over strain gauges alone. See M. A. Sutton et al., *Image Correlation for Shape, Motion, and Deformation Measurements: Basic Concepts, Theory, and Applications*, Springer US (2009). DIC is length- and time-scale independent, with the one common denominator to all DIC measurements being the necessity of imaging a high-contrast pattern on the surface of the test specimen. The pattern is subsequently tracked with image correlation algorithms through a series of images captured while the test specimen is deformed.

For combined thermal and strain measurements, infrared thermography combined with DIC (IR+DIC) is commonly employed. See L. Bodelot et al., *Mat. Sci. Eng. A-Struct.* 501(1-2), 52 (2009); A. Chrysochoos et al., *Strain* 46(1),117 (2010); P. Knysh and Y. P. Korkolis, *Mech. Mater.* 86, 71 (2015); A. Gilat et al., "Full field strain measurement in split Hopkinson bar experiments," *Proceedings of the 9th Biennial Conference on Engineering Systems Design and Analysis*, 1, 561 (2008); T. Pottier et al., *Eur. J. Mech. A—Solid* 38, 1 (2013); X. G. Wang et al., *Opt. Laser. Eng.* 94, 17 (2017); G. C. Soares et al., *Exp. Tech.* 45(5), 627 (2021); N. Cholewa et al., *Exp. Mech.* 56(2), 145 (2015); J. A. O. Gonzalez et al., DIC-IR Analysis of Transient Thermal Stresses. *Conference Proceedings of the Society for Experimental Mechanics Series* 7, 67 (2021); and J. D. Seidt et al., *Exp. Mech.* 57(2), 219 (2017). This IR+DIC methodology, while successfully demonstrated, has a few obstacles, including: 1) the necessity to carefully characterize the test specimen emissivity, 2) the requirement of multiple high resolution and often costly cameras, 3) the geometric constraints on positioning the cameras to obtain the desired field-of-view in all images, 4) a limitation on the maximum image acquisition speeds, particularly for IR cameras, 5) the potentially mismatched synchronicity between IR and visible images, and 6) the post-processing requirements to register measurements from both diagnostics onto a common point cloud in 3D space. In part due to these obstacles, researchers have also sought unique ways to utilize single IR cameras or even single CCD chips for combined thermo-mechanical measurements. See X. G. Wang et al., *Opt. Laser. Eng.* 94, 17 (2017); M. L. Silva and G. Ravichandran, *J. Strain Anal. Eng.* 46(8), 783 (2011); J. J. Orteu et al., *Exp. Mech.* 48(2), 163 (2007); and A. Maynadier et al., *Exp. Mech.* 52(3), 241 (2011).

As described above, among several thermography techniques, thermographic phosphors (TP) can provide full-field temperature measurements via the "two-color ratio method." See L. Yule et al., *Meas. Sci. Technol.* 32, 1 (2021); and M. D Dramicanin, *J. Appl. Phys.* 128, 1 (2020). Dopants, or activator atoms, are electronically excited after absorption of incident ultraviolet (UV) photons, and subsequently relax back to a lower energetic state (the ground state) through spontaneous emission or internal energy transfer. Spectrally resolving this emission to isolate specific transitions allows two or more spectral bands to be ratioed, generating a calibration between intensity ratio and temperature. This two-color ratio method is depicted in FIG. 1 for the exemplary $Mg_3F_2GeO_4$:Mn (MFG) phosphor. Similar to IR+DIC, there are also numerous examples of thermographic phosphors being combined with other diagnostics, such as Particle Image Velocimetry (TP+PIV) and Laser Doppler Velocimetry (TP+LDV) to produce both full-field velocity distributions and gas phase temperatures. See A. Omrane et al., *Appl. Phys. B* 92(1), 99 (2008); A. O. Ojo et al., *Opt. Express* 25(10), 11833 (2017); C. Abram et al., *Prog. Energ. Combust.* 64, 93 (2018); and C. Abram et al., *Appl. Phys. B* 111, 155 (2013). Additionally, phosphors have been employed for combined temperature and strain measurements through Moire Interferometry and more recently attempted with DIC. See R. Marino et al., *AIAA Journal* 37(9), 1097 (1999); R. Prins et al., "An optical method for simultaneous measurement of surface strain and temperature", in 33rd *Aerospace Sciences Meeting and Exhibit*, Jan. 9-12, 1995; and T. Cai et al., *Meas. Sci. Technol.*, 32(9), 095204 (2021).

This invention expands upon the combined diagnostics idea to generate simultaneous measurements of strain and surface temperatures through Thermographic Phosphor Digital Image Correlation (TP+DIC). TP+DIC is an alternative to other combined diagnostics such as IR+DIC, reducing equipment complexity/cost, removing synchronicity concerns, and simplifying data registration. Moreover, TP+DIC is a synergetic coupling of two diagnostics, elevating both. Some advantages include:

1. A DIC speckle pattern from TPs generates high-contrast optical images even at elevated temperatures where other patterning methods suffer due to interference from blackbody radiation of the test specimen and degradation of the patterning material (especially for paint-based patterns).

2. DIC algorithms accurately register material points with subpixel precision in both of the images of the stereoscopic camera system, reducing uncertainty in full-field temperature measurements from the phosphor two-color ratio method thermography.

3. Equipment is common between both diagnostics; only two machine vision cameras are required to make stereo-measurements of both strains and temperatures.

As an example, the TP+DIC methodology was developed and applied to characterize the thermo-mechanical response of 304L stainless steel dog bone tensile bars during the conversion of plastic work into heat. The description is outlined as follows. First, fabrication of the dog bone tensile bars and patterning with phosphor via aerosol deposition is described, and then the experimental setup is presented for tensile testing of the dog bones at various strain rates. The in situ phosphor calibration procedure is referenced, and the image processing steps are presented for computing strains from stereo-DIC and temperatures from phosphor two-color ratio method thermography. The combined full-field strain and temperature fields are presented to describe the thermo-mechanical response of the dog bone samples. Then, a qualitative description of the phosphor pattern degradation with applied strain is provided, along with initial observations of the evolution of phosphor emission as a function of applied substrate strain. Noise and bias errors are quantified with additional discussion on the effects of DIC matching errors, incomplete pixel illumination, and strain-induced change to photoluminescence of the phosphor coating provided. Finally, the TP+DIC method is compared and contrasted with the more established IR+DIC method.

Compared to a previous attempt of TP+DIC by Cai et al., the methodology and analysis presented here represent several major improvements, including the creation of tailored phosphor DIC patterns, careful treatment of detector non-linearity and lens spatial nonuniformity, the use of stereo-DIC for 3D surface measurements over 2D-DIC, accurate DIC strain computation and analysis, and thorough uncertainty quantification. See T. Cai et al., *Meas. Sci. Technol.*, 32(9), 095204 (2021). The TP+DIC methods described here provide a solid foundation for the combined diagnostics, and the application to material characterization during a thermo-mechanical test demonstrates the utility of TP+DIC for combined, simultaneous, full-field temperature and strain measurements.

Dog Bone Tensile Bars

Dog bone tensile bars were fabricated from 304L stainless steel sheet metal, which is anisotropic, rate dependent and temperature dependent. This material was chosen as an exemplar for demonstrating the TP+DIC method because it experiences significant temperature rise due to the conversion of plastic work into heat. See G. I. Taylor and H. Quinney, *P. Roy. Soc. A—Math. Phy.* 143(A849), 0307 (1934).

The sheet was nominally 1.6 mm (1/16 in.) thick, and the gauge section was 31.8 mm (1.25 in.) long in the axial direction and 9.5 mm (3/8 in.) wide. There was a gradual taper in the gauge section width, with the deviation from the nominal width not larger than 0.13 mm (0.005 in.), to induce failure at the gauge section center. The samples were patterned with phosphor as described below.

Three Type-E thermocouples were spot-welded to the back of the dog bone samples, in the center and at ±12.7 mm (±0.5 in.) along the gauge length. Given the sample thickness and the associated Biot number, the temperature should be uniform through the thickness of the sample; thus, the temperatures inferred on the front of the sample from the phosphor thermography can be compared to the reference thermocouples on the back of the sample.

DIC Patterning with Aerosol Deposition

Figure 15:
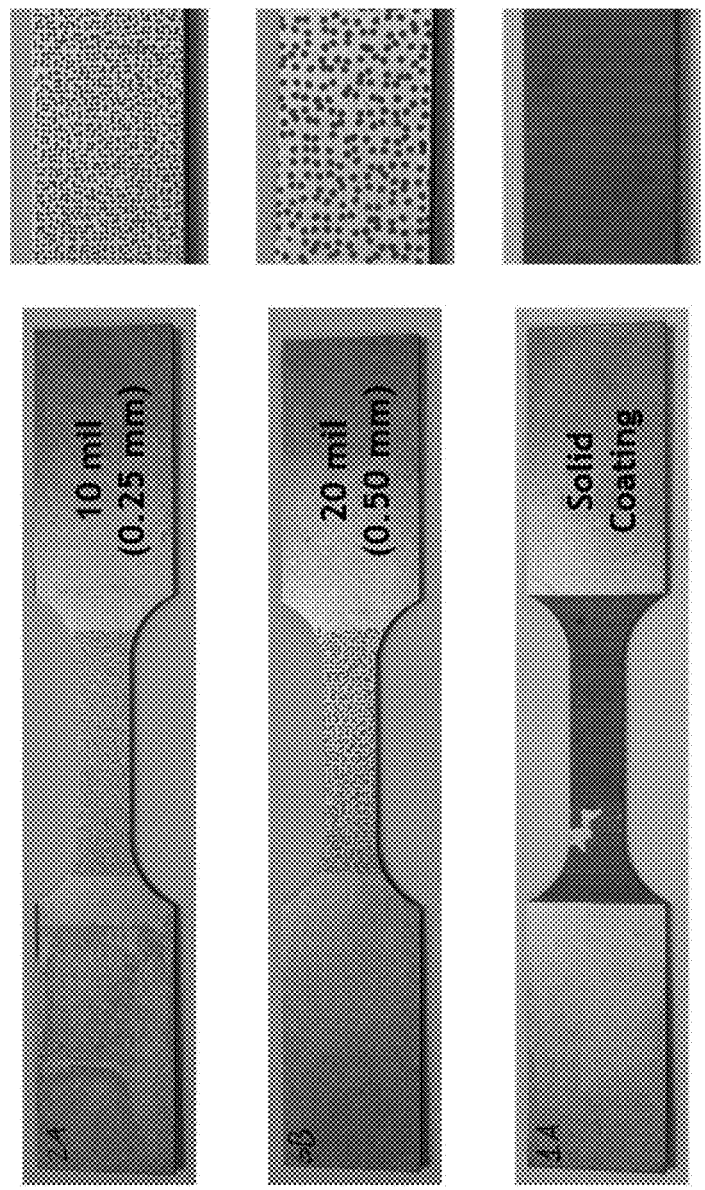
FIG. 15 shows photographs of representative tensile bars with aerosol-deposited (AD) phosphor coatings with different feature/dot sizes. The right column provides a magnified view. For scale, the width of the gauge section was 9.5 mm (3/8 in.).

In order to generate a robust coating of phosphors in a DIC pattern that adhered well to the substrate with no need for binders, a new process for masking and deposition was developed. First, shadow masks were created by laser-milling DIC features (i.e. holes) in Kapton tape (25.4 mm (1 in.) wide, 25 μm (0.001 in.) thick) using a LPKF ProtoLaser U3 tool. Second, samples were cleaned using a WypAll with acetone, followed by isopropanol and then distilled water, and the Kapton tape masks were adhered to the tensile dog bones. Then, phosphor was deposited using Aerosol Deposition (AD) through the mask, creating DIC features (i.e. dots or speckles) on the surface of the dog bone samples. Finally, the mask was carefully removed. Representative images of the resulting phosphor DIC patterns for different sized features are shown in FIG. 15. In addition to the patterned samples, one sample had a solid coating of phosphor for comparison. A laser scanning profilometer was used to determine that the phosphor thickness was approximately 4 μm.

Figure 16:
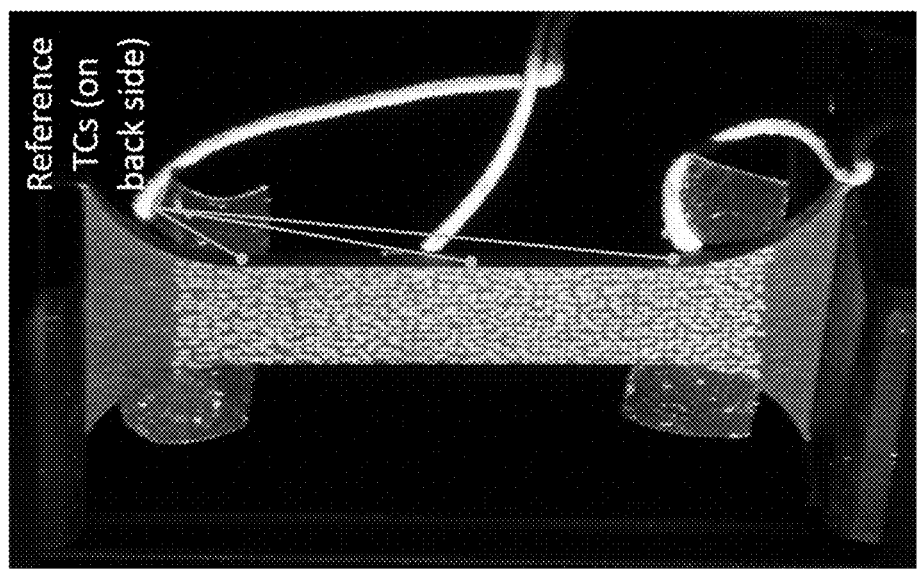
FIG. 16 is an image as seen "by eye" (i.e. captured with a color DSLR camera) of the tensile dog bone with phosphor DIC pattern, illuminated by the UV lamps, with three thermocouples (labeled "TCs") spot-welded on the back.

The AD setup used is described above in the section titled Phosphor Calibration Sample Fabrication. The experimental setup for TP+DIC of the dog bone samples tested in a mechanical load frame is shown in FIG. 2 and described in the section titled Experimental Setup for TP+DIC. The lamps were either run continuously or were pulsed at 1 Hz or 3 Hz with 150 ms pulse width, depending on the strain rate of the test (see Table 4), to minimize sample temperature rise due to the impinging UV excitation light. Prior to testing, the lamps were warmed-up for at least 30 minutes in the configuration used for the test to allow the light intensity to stabilize and the initial sample temperature to equilibrate. The sample temperature rose either 3° K or 6° K above room temperature, for pulsed and continuous configurations, respectively (as measured by the thermocouples spot-welded to the dog bone surface). The sample was mounted vertically in mechanical wedge grips in a 100 kN (22 kip) MTS load frame. The entire load frame was encased in a light-tight black-out tent to prevent room light from influencing the phosphor emission results. FIG. 16 shows an image captured with a DSLR camera of the patterned dog bone sample, inserted in the load frame, and illuminated by the UV LEDs.

In Situ Phosphor Calibration

As described above, in order to use the phosphor two-color ratio method to infer temperatures from the phosphor emission, a calibration curve of the intensity ratio between the two relevant spectral bands and the temperature must be generated. Here, the intensity ratio is defined as $I_r = I_{633}/I_{660}$, where $I_{633}$ and $I_{660}$ are the corrected intensity values from $Cam_{633}$ and $Cam_{660}$, respectively. This temperature versus intensity ratio calibration curve is known to be sensitive the experimental design geometry, such as camera position and orientation. See J. Brubach et al., *Prog. Energ. Combust.* 39(1), 37 (2013); and N. Fuhrmann et al., *P. Combust. Instit.* 34(2), 3611 (2013). Therefore, the current best practice is to use an in situ calibration procedure to generate the calibration curve, using the exact experimental setup as that used for the test. Additionally, to obtain accurate two-color thermography measurements, the nonlinearity and heterogeneity of the CMOS detectors must be corrected, so that the image intensity of each pixel is linearly proportional to the number of photons impinging upon the pixel. See C. Abram et al., *Appl. Phys. B* 111, 155 (2013); B. Fond et al., *Appl. Phys. B* 121(4), 495 (2015); V. Weber et al., *Appl. Phys. B* 103(2), 421 (2011); and T. Kissel et al., *Appl. Phys. B* 96(4), 731 (2009). Finally, a spatial variation of the intensity ratio across the image (posited to be due to wavelength-dependent transmission efficiency of the lens) was found for this experimental setup, necessitating a separate calibration curve for each pixel in the detector. The detector correction, in situ calibration process, and spatial non-uniformity of the lens used for the current work are described above in the sections titled Flat-Field Corrections and Spatial Non-Uniformities and Temperature-vs-Intensity Ratio Calibration Curves. The resulting pixel-wise calibration curves are shown in FIGS. 7A and 7B. For the current study, tensile test data was processed using the corresponding calibration curves collected on the same day (FIG. 7A).

Mechanical Test Method

At the beginning of each test day, two calibrations were performed. First, a standard stereo-DIC calibration was completed—where a dot-grid calibration target (4 mm spacing, Correlated Solutions) was tilted, rotated, and plunged throughout the calibration volume—to determine the intrinsic and extrinsic parameters of the stereo-imaging system with a second-order radial lens distortion model. Second, an in situ phosphor calibration was performed to determine the pixel-wise temperature versus intensity ratio curves. Both processes are described above.

In total, six dog bone samples were tested, with varying phosphor pattern and strain rate conditions, as summarized in Table 4. The exposure time was locked between both camera/filter pairs and bounded by good signal-to-noise in the room temperature images. Ideally, shorter exposure times could be used, to improve temporal resolution and limit motion blur as described below; however, this would require either higher excitation light fluence and/or a thicker phosphor film to generate sufficiently bright images. The frame rate was set to provide a reasonable number of images during testing for the given strain rates. However, cameras are commercially available with up to 5 MHz data acquisition rates.

TABLE 4

Phosphor DIC pattern and test condition parameters for six dog bone samples tested.

| Sample Name | 5A | 6B | 3B | 1A | 2A | 4A |
|---|---|---|---|---|---|---|
| Date Tested | 2021-04-13 | 2021-04-15 | 2021-04-15 | 2021-04-15 | 2021-04-22 | 2021-04-22 |
| Feature Diameter (mm) | 0.50 | 0.50 | 0.50 | solid | 0.25 | 0.50 |
| Feature Density (%) | 75 | 65 | 75 | solid | 65 | 65 |
| Actuator Velocity (mm/mm) | 3.8 | 15.2 | 152.4 | 15.2 | 15.2 | 0.4 |
| Strain Rate (s$^{-1}$) | 0.002 | 0.008 | 0.08 | 0.008 | 0.008 | 0.0002 |
| Image Frame Rate (Hz) | 3 | 10 | 24 | 10 | 10 | 1 |
| Exposure Time (ms) | 70 | 40 | 40 | 40 | 60 | 90 |
| Light Pulse Rate (Hz) | 3 | continuous | continuous | continuous | Continuous | 1 |
| Light Pulse Width (ms) | 150 | continuous | continuous | continuous | Continuous | 150 |

The slowest strain rate of 0.0002 s$^{-1}$ was chosen to induce no measurable temperature rise and act as a control test to assess the response of the phosphor to tensile loading. A strain rate of 0.002 s$^{-1}$ was chosen to match prior testing with IR+DIC (see Comparison of TP+DIC and IR+DIC) and to provide an intermediate rate. The rate of 0.008 s$^{-1}$ was the fastest achievable without image blur challenges for the experimental conditions; the maximum displacement within an image exposure was approximately 0.2 px at this rate, which is just below the threshold recommended by the *Good Practices Guide for DIC*. See International Digital Image Correlation Society (iDICs), *A Good Practices Guide for Digital Image Correlation* (2018). Finally, the fastest strain rate, 0.08 s$^{-1}$ was chosen to match prior testing with IR+DIC, with acknowledged image blur challenges, where the maximum displacement within an image exposure was approximately 2.2 px; maximum temperature rise due to plastic work occurred at this rate. Before all tests, samples were precycled in load control (31 N/s, 444 N amplitude) to settle the dog bones in the grips.

Two different phosphor features sizes were tested, either 0.50 mm or 0.25 mm diameter, corresponding to approximately 10 px or 5 px, respectively, given an image scale of 21.5 px/mm. While the *Good Practices Guide for DIC* recommends features between 3-5 px, the effect of partial pixel illumination on phosphor temperature measurements for pixels that were on the border of the features (i.e. for pixels whose intensity was a combination of phosphor and sample background) may be a concern. Thus, most samples had large (0.5 mm or 10 px) features, so that phosphor measurements could be made only on pixels that were clearly inside the features with complete phosphor pixel illumination.

Image Processing

The test images were processed using Correlated Solutions Vic-3D 9 DIC software with the user-defined parameters shown in Table 5. Using the zero-normalized sum-of-square-differences (ZNSSD) matching criterion compensated for the different image intensities between the two camera/lens/filter pairs, as well as the evolving image intensities as the sample temperature (and thus phosphor emission) increased. This correlation step mapped material points from $Cam_{660}$ to $Cam_{633}$ and tracked them through the image series during sample deformation. A best plane fit after DIC analysis set the Z-axis perpendicular to the undeformed dog bone samples, and then a coordinate transform was applied to align the X-axis with the length of the gauge section, with X=0 set to the center of the gauge section. Full-field strains were computed in this coordinate system using Vic-3D 9.

Critically, this DIC processing not only provided the kinematic quantities-of-interest (e.g. strain of the tensile bars), but it also provided accurate identification of material points on the sample in each camera image to subpixel precision. This accurate image registration step is key for accurate intensity ratios for the phosphor thermography and represents a major advancement for phosphor two-color ratio method.

Figure 17:
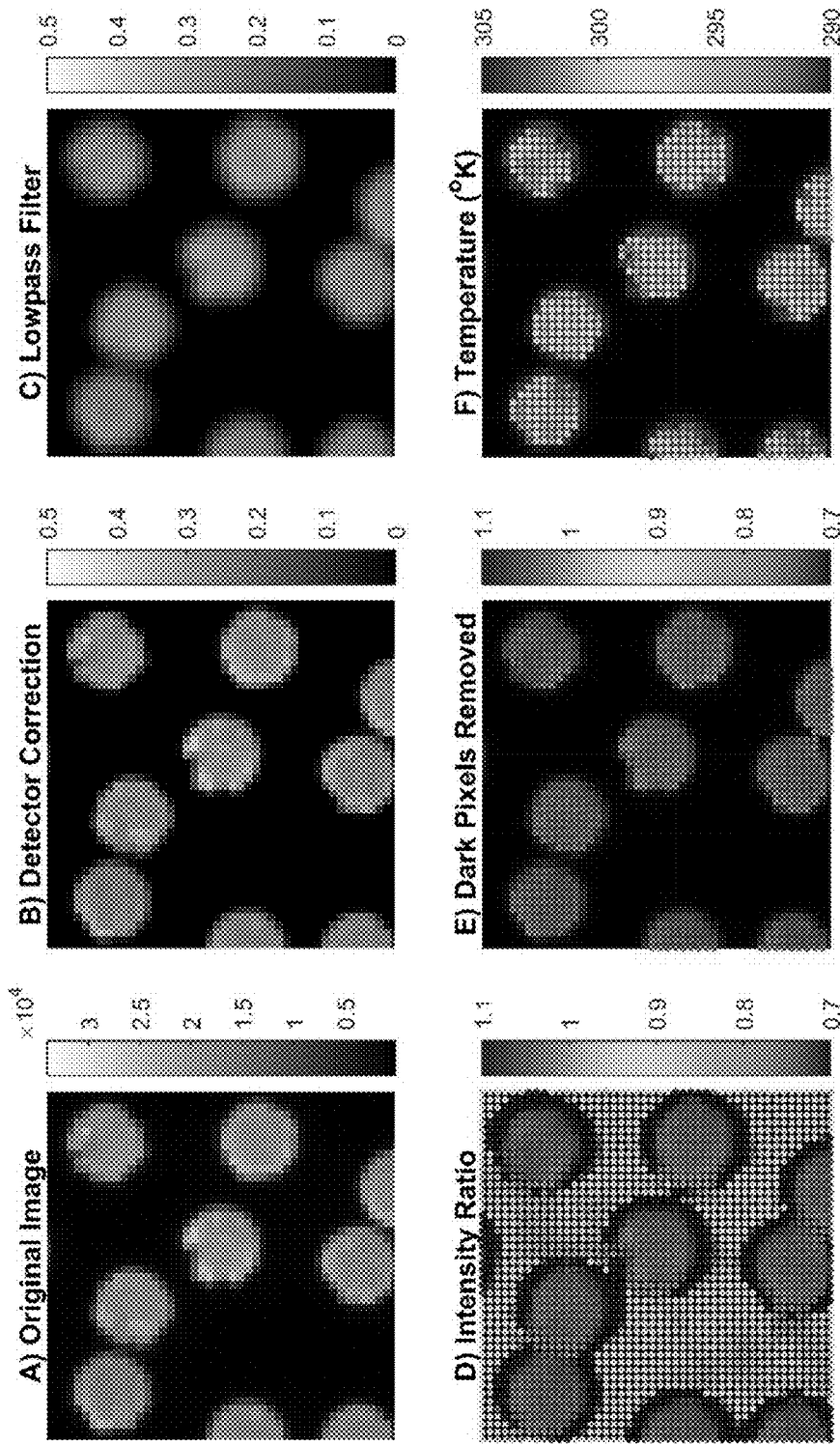
FIGS. 17A-F illustrates the steps for image analysis including: A) the original image (16-bit), B) the image corrected for the detector non-linearity and heterogeneity, C) the image with a lowpass filter applied, D) the computed intensity ratio, E) the intensity ratio after saturated and dark pixels were removed from consideration, and F) the inferred temperature field after applying a pixel-wise cubic calibration curve (FIG. 7A). A 45×45 $px^2$ region is shown, which also corresponds to the DIC subset size. Color bars represent: A) original image intensity, B-C) corrected image intensity, D-E) intensity ratio, and F) inferred temperature.

After employing DIC location mapping, images were further processed using a code developed in-house to infer temperature across the field-of-view. These steps are enumerated below and shown graphically in FIG. 17.

Load the original image (FIG. 17A).

Apply a pixel-wise quintic detector correction to relate image intensity directly to impinging photons (FIG. 17B).

Apply a lowpass filter to the image set to reduce noise and pre-condition the image for intensity interpolation (FIG. 17C).

Interpolate image intensities to sub-pixel locations in the $Cam_{633}$ undeformed image and the deformed image sets from both $Cam_{660}$ and $Cam_{633}$.

Use the mapping from DIC between $Cam_{633}$ and $Cam_{660}$ to compute the intensity ratio between the image sets for every point in the DIC point cloud (FIG. 17D).

Remove any saturated or dark pixels from the computed intensity ratio map, to retain temperature measurements only for unsaturated pixels that were within the phosphor features (FIG. 17E).

Apply a pixel-wise cubic polynomial calibration curve (FIG. 7A) to infer temperatures from the intensity ratios across the field-of-view (FIG. 17F).

TABLE 5

TP + DIC Image Processing Parameter

| DIC Parameter | Value |
| --- | --- |
| Image scale | 21.5 px/mm (approximate) |
| Image prefiltering | 3 × 3 binomial |
| Subset size | 45 px (2.1 mm) |
| Step size | 1 px (0.05 mm) |
| Subset shape function | Affine |
| Subset weighting | Gaussian |
| Interpolant | Optimized 8-tap |
| Reference image | Incremental correlation |
| Matching criterion | ZNSSD |
| Strain tensor | Hencky |
| Strain window | 31 data points |
| VSG size | 75 px (3.5 mm) |
| TP Parameter | Value |
| Image prefiltering | Gaussian, σ = 1 |
| Interpolant | Cubic spline |
| Low density threshold | $10^4$ (on a 16-bit scale) |

Thermo-Mechanical Response

Combining the experimental and analysis methodology described heretofore, the combined thermo-mechanical response of the tensile bars can be examined with TP+DIC.

Figure 18:
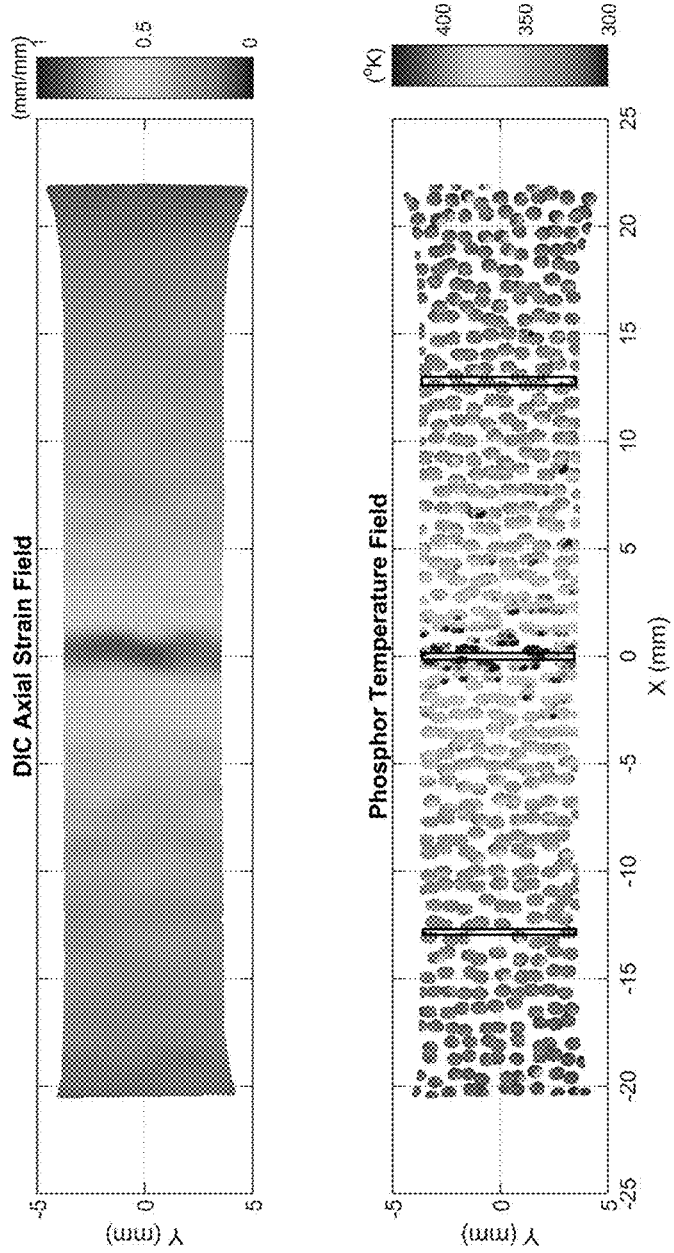
FIG. 18 illustrates full-field axial strain (top) and surface temperature (bottom) of Sample 6B immediately prior to failure. The locations of the "virtual" thermocouples (VTCs) are outlined by the black boxes. Data is plotted in the undeformed, reference configuration. Because the cameras were rotated to align their long axis with the long axis of the sample, the left side of the plots corresponds to the top of the sample.

FIG. 18 shows the contour plots of both DIC strain (top) and phosphor two-color ratio method temperature fields (bottom) immediately prior to failure for Sample 6B. The axial strain was interpolated across the full field-of-view as is standard practice for DIC, but the phosphor thermography is presented without interpolation to facilitate more detailed analysis of the results, including effects of partial pixel illumination near the phosphor dot edges. The contour plots illustrate the key features of the thermo-mechanical behavior of the sample. Namely, the maximum temperature occurred congruently with the maximum strain, in the center of the sample, with lower temperatures towards the edges of the sample, due to a combination of localized necking in the center and heat conduction to the load frame grips. Movies that animate the evolution of the deformation and resulting temperature rise can be made.

Figure 19:
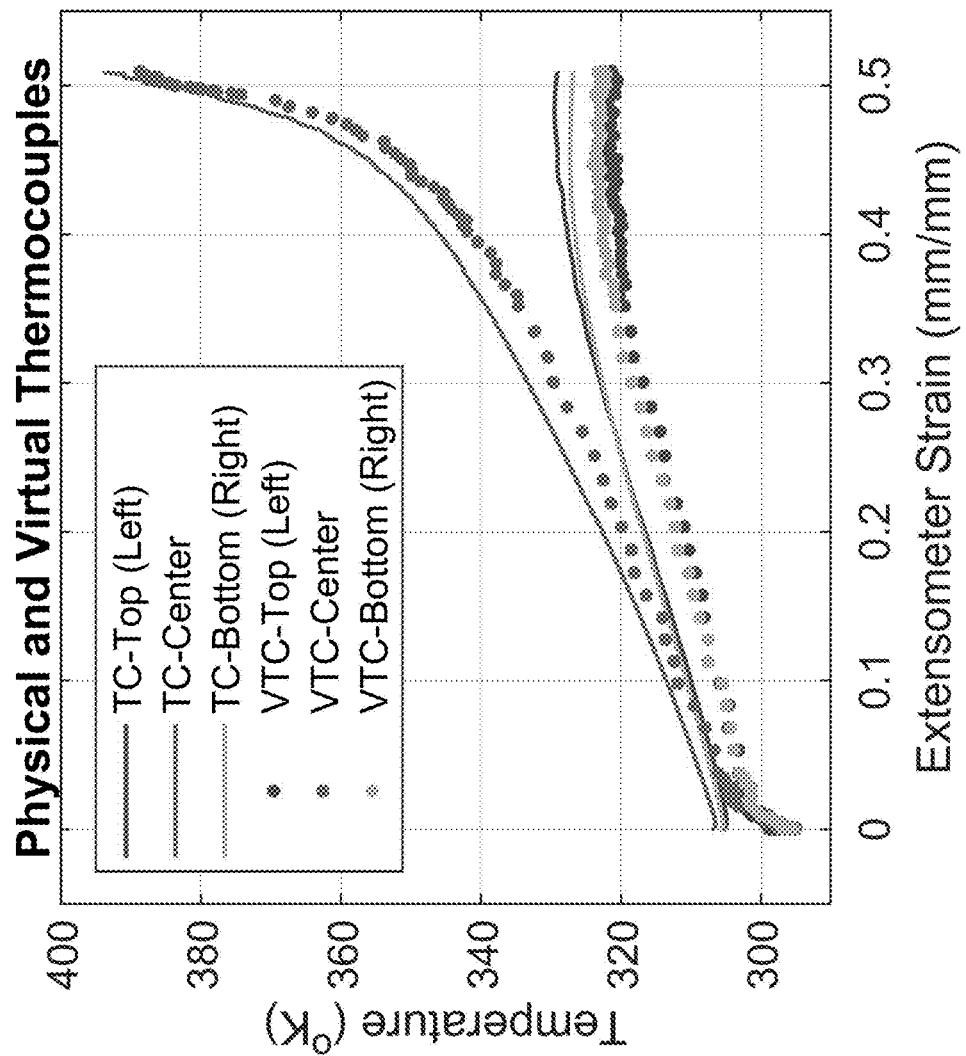
FIG. 19 shows a comparison of data from Sample 6B between reference thermocouples (solid lines, TCs) and "virtual" thermocouples (dots, VTCs), which are the temperatures inferred from phosphor two-color ratio method, averaged over the regions indicated in FIG. 18. Note that the total number of images analyzed was minimized to reduce accumulated error from incremental correlation, with a higher number of images in the elastic region and initial and final plastic regions to better resolve interesting behavior, and fewer images in the gradually-changing plastic region.

The three black boxes overlaid on the phosphor results in FIG. 18 are the locations of the "virtual" thermocouples (VTCs), which are temperatures averaged over a 0.25 mm wide strip (in the undeformed configuration) of the full-field phosphor thermography measurements. Recall that given the sample thickness and the associated Biot number, the temperature should be uniform through the thickness, and thus the VTCs can be directly compared to the physical TCs that were spotwelded on the back of the dog bones, as shown in FIG. 19.

Overall, the reference TCs and VTCs are in good agreement, both capturing the rise in temperature due to mechanical deformation, highest in the center and lower near the top/bottom (or left/right in FIG. 18) of the dog bone sample. However, there is a significant difference in the initial temperature, between 0.00-0.02 mm/mm strain, and a systematic cold bias for the VTCs throughout testing. These errors are discussed further below.

Figure 20B:
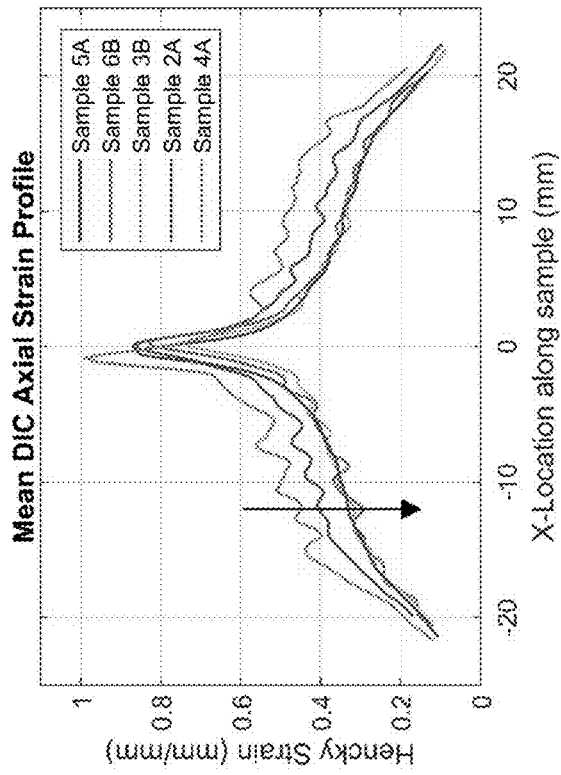
FIGS. 20A-D summarize the TP+DIC results for all samples tested in the series characterizing the conversion of mechanical work into heat. Data is plotted in the reference, undeformed coordinate system, where X=0 indicates the center of the gauge section. The axial strain and phosphor temperature profiles are given for the image immediately prior to failure. Black arrows indicate trends with increasing strain rate (see Table 1).
Figure 20C:
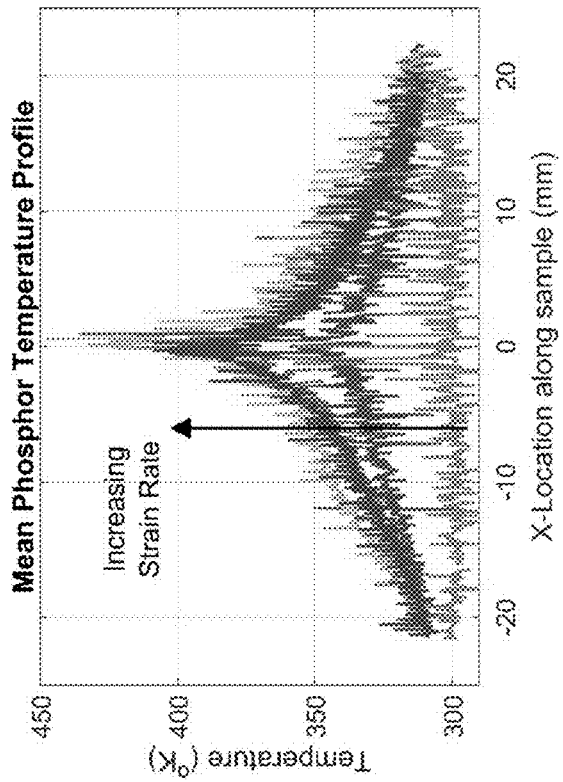
Figure 20A:
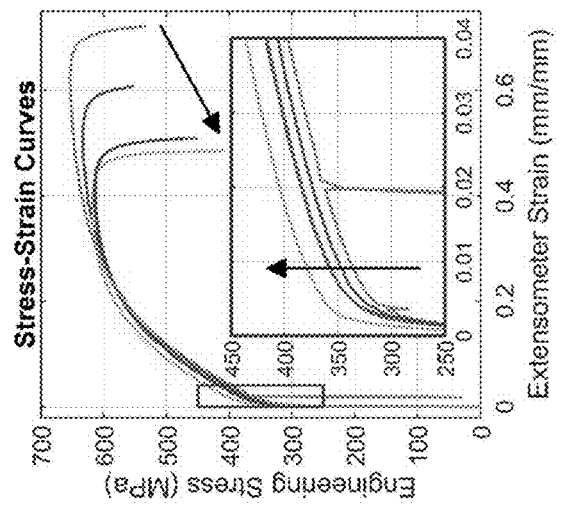

Combining the data from five samples patterned for DIC with thermographic phosphors demonstrates the power of the TP+DIC diagnostic for thermo-mechanical material characterization, shown in FIGS. 20A-D. FIG. 20A plots the typical mechanical response of 304L through the engineering stress-strain curves (with the inset highlighting yield and initial plasticity). Typical of this rate- and temperature-dependent material, the yield stress increases and the strain-to-failure decreases with increasing strain rate. Recall from Table 4 that four strain rates were tested, 0.0002 $s^{-1}$ (Sample 4A), 0.002 $s^{-1}$ (Sample 5A), 0.008 $s^{-1}$ (Samples 6B and 2A), and 0.08 $s^{-1}$ (Sample 3B). For Sample 4A, the loading was interrupted to investigate the phosphor emission change near yield, hence the drop in stress near 0.02 mm/mm strain.

FIG. 20B plots the mean axial strain (averaged over the width of the sample) inferred from DIC immediately prior to failure. The maximum strain for all strain rates occurred at or near X=0 mm (in the reference, undeformed configuration), which is the point of necking and failure. Maximum strain levels again showed the combined rate- and temperature-dependent effects of 304L, with the fastest sample (3B) obtaining the lowest strain and the slowest sample (4A) obtaining the highest strain.

FIG. 20C plots the mean phosphor temperature along the tensile sample immediately prior to failure. The peak temperature is dependent on the strain rate, directly increasing with faster rates.

Figure 20D:
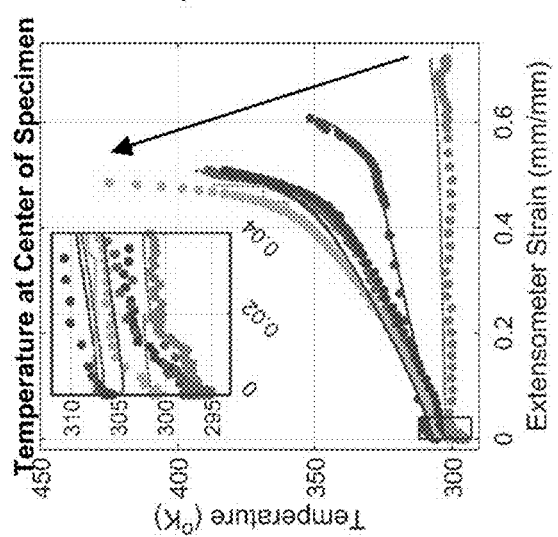

Finally, FIG. 20D compares the temperatures at the center of the sample where necking and failure occurred, from the reference thermocouples (solid lines, TCs) to the "virtual" thermocouples (dots, VTCs) inferred from phosphor two-color ratio method thermography. Overall, the results are in good agreement with each other and capture the same trends of increasing temperature with increasing strain rate. Note that for the fastest displacement rate (Sample 3B, yellow dots and lines), the NI cDAQ system recording the reference TC was response-time limited, leading to a stair-step type behavior; in contrast, the VTC responded smoothly and captured the heat generated by mechanical work. The inset highlights the early portion of the test, where there are discrepancies between the phosphor and reference temperatures, which are discussed more below.

Uncertainty Quantification

Phosphor Pattern Degradation

Two notable observations occurred for all mechanical tests: 1) the phosphor brightness had a sharp increase immediately after the sample achieved yield, and 2) the subsequent plastic deformation caused the phosphor pattern features to crack. These phenomena are presented in this section, using Sample 6B as an exemplar.

Evolution of Phosphor Emission with Strain

Figure 21:
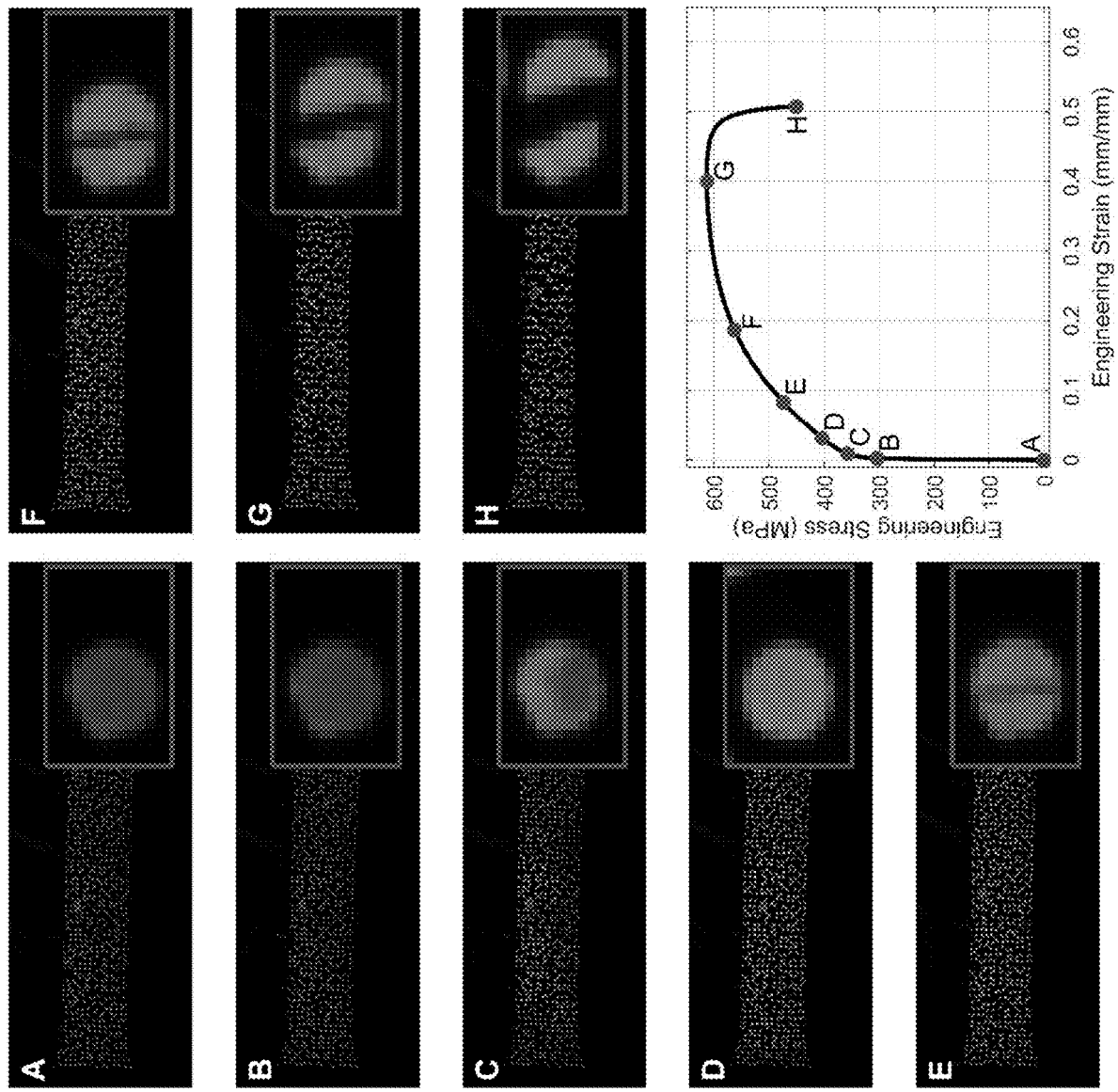
FIGS. 21A-H shows $Cam_{660}$ images of Sample 6B, with 0.50 mm dots. Each image has a corresponding location on the experimental stress-strain diagram. The inset is 22 px wide by 14 px high.

As Sample 6B was pulled through the elastic region, no visible changes were observed in the images (FIGS. 21A-B). As the sample moved through initial yield, however, the image brightness increased dramatically (FIGS. 21C-D). The sequential image set has no change in camera settings or exposure time; the increase in image intensity starting in FIG. 21C and propagating in FIG. 21D is attributed to an actual increase in phosphor emission, which occurred in both cameras (i.e. at both 630 nm±10 nm and 660 nm±5 nm). All samples tested had similar behavior.

The change in phosphor emission (photo-luminescence) as a function of the applied substrate strain was unexpected, as previous studies have shown the decay time of MFG phosphor to be either insensitive to pressure (which can be viewed as a volumetric compressive strain) or sensitive only when the temperature exceeded 700° K. See J. Brubach et al., *Meas. Sci. Tech.* 19(2), 1 (2008); J. Brubach et al., *Meas. Sci. Tech.* 18(3), 764 (2007); and Tao Cai et al., *Meas. Sci. Tech.* 30(2), 1 (2019). Additionally, this effect is irreversible and persistent, such that the increased intensity remained even after the test has stopped. This is unlike tribo-, fracto-, or mechano-luminescence effects, which are all transient phenomena. Allison et al. investigated the use of other rare-earth doped phosphors (in particular, $YVO_4$:Dy, $Gd_2O_2S$:Tb, and $La_2O_2S$:Eu) as strain sensors, exploiting their pressure- or strain-dependent luminescent changes. See S. W. Allison et al., "Thermographic phosphor strain measurements", *EPRI Technical Report*, EPRI-TR-103867 (1994). This work provides an interesting perspective on the observed behavior: the applied substrate strain can affect the spectrally integrated emission of MFG through adiabatic mechanisms such as fluorescence line shift, peak broadening/narrowing, and/or fluorescence excitation band shift, among others.

Phosphor Cracking

The phosphor dots first crack in Sample 6B at a strain of nearly 0.1 mm/mm (FIG. 21E). Through the course of the test, a high percentage of the patterned dots cracked, requiring incremental DIC correlation to be employed for image analysis. Notably, while the dots cracked, they remained adhered to the substrate during testing, up until the point of sample failure. Sample 2A, with mm diameter features, had similar behavior, but cracks first appeared near 0.2 mm/mm strain (twice as large as with Sample 6B), and overall, a lower percentage of features cracked. In contrast, Sample 1A, which had a solid coating, experienced severe degradation and delamination, preventing any analysis of its thermo-mechanical behavior.

From previous studies of aerosol deposition of other ceramic materials, it is known that the coatings have a residual compressive stress after deposition. See A. Vackel, *J. Therm. Spray Tech.* 30(3), 584 (2020); and J. Adamczyk and P. Fuierer, *Surf. Coat. Tech.* 350, 542 (2018). Therefore, nano and micro cracks may relieve the residual stress as the underlying substrate is strained in tension, eventually accumulating into the macro cracks observed in this test series.

Variance Errors

Noise floors for the full-field strains, full-field temperatures, and virtual thermocouples are tabulated in Table 6. The full-field noise floors were taken as the spatial standard deviation of the nominally uniform strain/temperature fields of the deformed dog bone sample at a nominal strain of 0.20 mm/mm. By computing the standard deviation at 0.2 mm/mm strain instead of at 0 mm/mm (i.e. from static images of an undeformed dog bone sample), matching or correlation errors (especially the accumulation of matching errors over time due to incremental correlation) and effects of the phosphor pattern degradation are partially accounted for. This method results in a significantly higher strain noise (almost three orders of magnitude increase) than the noise computed from static images, but is a more conservative noise threshold. Since the VTCs are area averages, the noise was only computed as the standard deviation of the first 10 static images where there was no deformation.

TABLE 6

Noise floors for the full-field strains from DIC, as well as full-field temperatures and virtual thermocouples (VTCs) from phosphor two-color ratio method thermography.

| Sample | DIC Feature Size | Full-Field Strain Noise (mm/mm) | Full-Field Temperature Noise (° K) | VTC Noise (° K) |
|---|---|---|---|---|
| 5A | 0.50 mm (10 px) | 0.010 | 11.5 | 1.7 |
| 6B | 0.50 mm (10 px) | 0.012 | 9.5 | 1.0 |
| 3B | 0.50 mm (10 px) | 0.011 | 7.8 | 2.5 |
| 2A | 0.25 mm (5 px) | 0.005 | 12.5 | 0.7 |
| 4A | 0.50 mm (10 px) | 0.012 | 10.3 | 1.1 |

The strain noise floor was approximately 0.010-0.012 mm/mm (or 1.0-1.2 percent strain) for all samples with a 0.50 mm diameter feature size, and was notably half as large (0.005 mm/mm) for Sample 2A that had a dot feature size of 0.25 mm. This reduction is attributed to the increased number of features per subset, as well as less phosphor cracking in Sample 2A, both of which led to better correlation results. Given that these noise levels were computed at 0.20 mm/mm applied strain, the signal-to-noise ratio was approximately 20 or 40 for the 0.50 mm and 0.25 mm feature sizes, respectively. It is expected that these noise values would be improved with improved phosphor patterns that maintained their integrity and allowed for standard (instead of incremental) correlation. The full-field phosphor temperature noise values were between 8-13° K. Two main sources of noise are identified: (1) Incomplete pixel illumination and phosphor cracking led to erroneous phosphor temperature measurements for pixels on the phosphor/metal border. The image processing algorithm can be refined to eliminate these spurious measurements. (2) No post-processing filtering was performed at this stage of the analysis, to facilitate a close look at the raw performance of the TP+DIC technique; the use of a spatial filter, such as is used in the strain computation, could reduce this noise level. Notably, though, Sample 2A that had the smaller feature size did not show elevated temperature noise compared to the other samples with larger features. This result was somewhat surprising as it was hypothesized that the smaller dots would not have a sufficient number of pixels with complete phosphor illumination to produce accurate temperature measurements. Based on these results, though, a feature size of 5 px is recommended going forward, as DIC measurements are significantly better and phosphor thermography measurements are equivalent.

Bias Errors

Figures 22A, 22B, 22C:
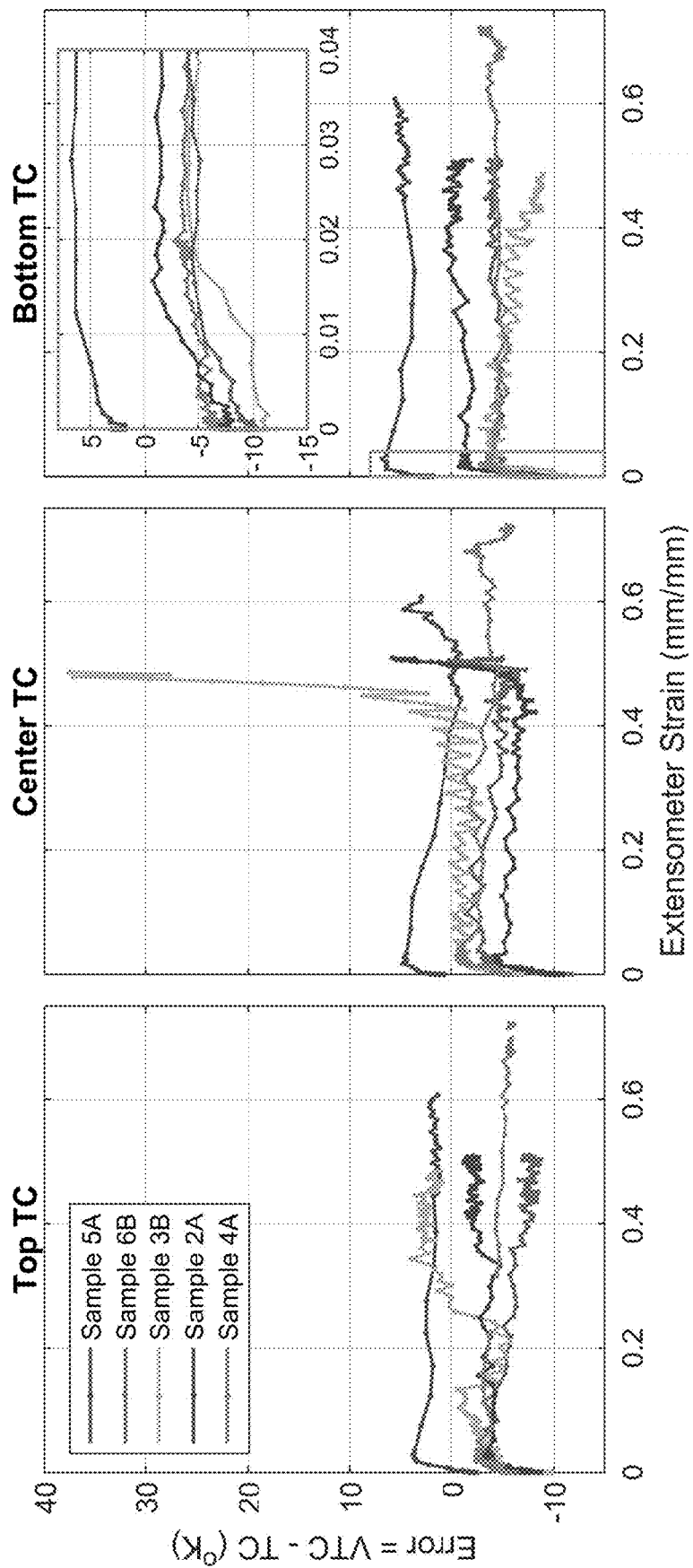
FIGS. 22A-C show error between reference and VTCs, located on the top (A), center (B), and bottom (C) of the tensile samples, throughout testing.

Bias errors in the phosphor thermography data were also investigated by comparing the VTCs with the reference physical TCs. FIGS. 22A-C show the TC errors, as defined by the difference between the VTC and the reference TC. All samples, except Sample 5A, show an initial negative error, indicating the VTCs are reading a colder initial temperature. The inset of the "Bottom TC" FIG. 22C shows this early behavior, which is representative of all three TCs. This error is reduced after the samples have passed yield, around 0.02 mm/mm, and then the error remains relatively constant throughout testing. The apparent correction is an artifact of the increase in phosphor emission intensity (hypothesized to be caused by strain-induced changes to the photo-luminescence), not a real temperature rise. The increased error fluctuations for the center TC of Sample 3B (yellow curve) are due to limitations of the NI cDAQ system recording the reference thermocouple during the fastest strain rate of 0.08 $s^{-1}$; eventually the rate of temperature increase exceeds the DAQ capability, leading to the asymptotic rise in error. Sample 5A was taken on the first day of testing, separate from all other samples, resulting in similar error trends, but a shift upwards.

The persistent bias between the TCs and VTC.s of approximately 5° K could be due to (a) differences in the aerosol deposition spray process between the calibration sample and the tensile bars, (b) effects of phosphor emission evolution caused by cracking and substrate strain, and/or (c) misalignment between the reference TC location and the chosen location of the VTC. Regarding (a), the calibration sample and tensile bars all were deposited with the same batch of phosphor, using nominally-identical spray parameters and resulting in the same nominal phosphor thickness. However, they were deposited at different times (phosphor calibration sample in October 2020 and tensile bars in February 2021), and fluctuations in the spray parameters could have led to a variance in phosphor coating properties. A calibration sample can be deposited at the same time as the tensile bars to test this hypothesis. Regarding (b), the correlation between the initial temperature difference and applied substrate strain is currently under further investigation. Regarding (c), while misalignment is possible, the same cold bias was observed for all three TCs on 4/5 samples (with a hot bias of similar magnitude for all TCs on the last sample); the consistency of the bias across so many TCs makes misalignment the least likely suspect.

Comparison of TP+DIC and IR+DIC

Because the combination of infrared (IR) imaging and DIC is relatively common and established in the literature, it is informative to compare and contrast IR+DIC to the TP+DIC method of the present invention. To make this comparison, historic IR+DIC data collected in the inventors' lab using tensile dog bones from the same lot of material as was used for the TP+DIC data. A brief description of the experimental methodology and data analysis methods for IR+DIC are presented, emphasizing similarities and differences between IR+DIC and TP+DIC. Then the IR+DIC thermo-mechanical data is compared and contrasted to the TP+DIC data of the tensile bars.

Experimental Setup for IR+DIC

Figure 23:
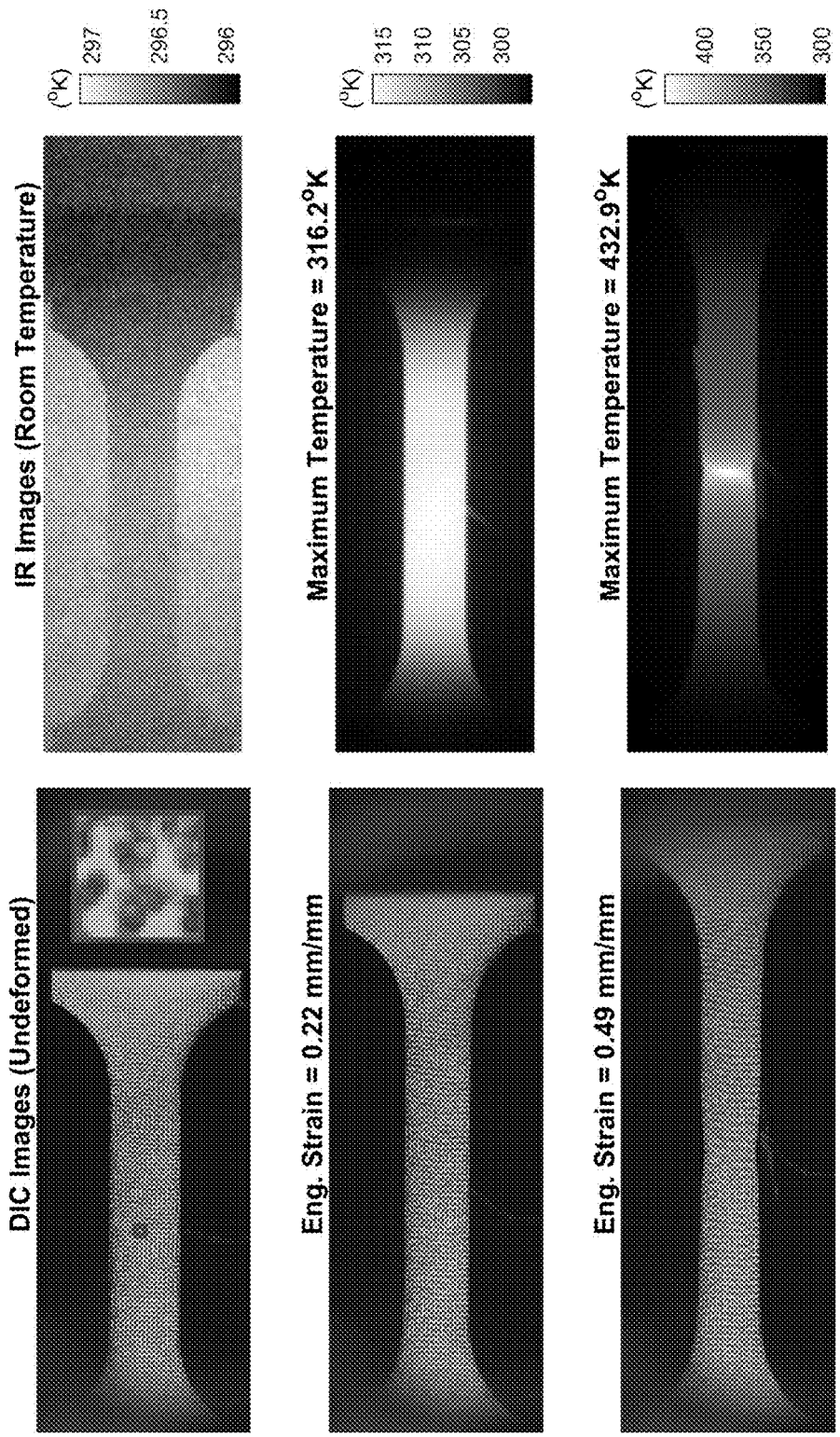
FIG. 23 shows DIC camera images (left) and IR camera images (right) of Sample S24 for select time steps. A representative DIC subset is shown in the red inset.

Tensile dog bone samples of 304L sheet metal were fabricated with the same dimensions and from the same lot of material as was used for TP+DIC. Samples were patterned with a base coat of white paint (Rustoleum brand) and black ink stamped features (Correlated Solutions). Two FLIR (formerly PointGrey) Grasshopper 2.3 MP USB3.0 cameras with 75 mm DG Series Edmund Optics lenses viewed the sample for stereo-DIC. A single long-wave IR camera (F.LIR, Model: A655sc, 7-14 µm, 640 480 $px^2$, 50 fps, 2° K) with a 13 mm focal length lens was mounted perpendicular to the sample, between the two DIC cameras. IR data was collected using FLIR's ResearchiR software. Samples were pulled to failure at nominal strain rates of 0.002 $s^{-1}$ or 0.08 $s^{-1}$ for samples S8 and S24, respectively, corresponding to samples 5B and 3B for the TP+DIC data. Select images of the DIC camera (left) and the IR camera (right) are shown in FIG. 23.

IR Camera Calibration

Analogous to the phosphor thermography measurements, IR thermography also requires correction of detector non-linearity and spatial nonuniformity, as well as a calibration to relate incoming photon counts to radiance and temperature. While IR camera corrections/calibrations can be generated in-house, more commonly, they are performed by the manufacturer at the factory using established methods, and the user simply applies the corrections/calibrations in the propriety IR camera software. The factory calibration was evaluated against a cavity-type blackbody source, and confirmed that between room temperature and 573° K (300° C.), the percent-error between the IR camera temperature readings and the blackbody reference temperature was within the manufacturer's specification (2° K or 2% of reading).

While detector corrections/calibrations are performed by the camera manufacturer, the user must determine the sample emissivity to input into the IR camera software. To determine the emissivity of the patterned tensile bar, the sample was placed in the environmental chamber and the chamber temperature from was swept room temperature up to 523° K (250° C.). The "emissivity calculator" in the IR camera software was used to compute the emissivity of the sample such that the resulting temperature measured by the IR camera matched a known, reference temperature. Using a computed emissivity of 0.89, the average sample temperature measured with the IR camera agreed with a reference temperature to within 2%. Note that the emissivity calibration was performed here on an undeformed sample, which is typical of emissivity calibrations in the literature. See, for example, G. C. Soares et al., *Exp. Tech.* 627 (2021); and N. Cholewa et al., *Exp. Mech.* 56(2), 145 (2015). This emissivity characterization does not take into account potential errors from paint changing emissivity and/or cracking during testing.

TABLE 7

IR + DIC parameters

| Parameter | Value |
|---|---|
| Image scale | 20.9 px/mm (approximate) |
| Image prefiltering | 3 × 3 binomial |
| Subset size | 25 px (1.2 mm) |
| Step size | 3 px (0.14 mm) |
| Subset shape function | Affine |
| Subset weighting | Gaussian |
| Interpolant | Optimized 8-tap |
| Reference image | Single, undeformed image |
| Matching criterion | ZNSSD |
| Strain tensor | Hencky |
| Strain window | 7 data points |
| VSG size | 43 px (2.1 mm) |
| Strain noise floor at 0.2 mm/mm applied strain | 1.7-1.8 × $10^{-3}$ mm/mm |

DIC Analysis

The DIC analysis used for the IR+DIC data was similar to that used for the TP+DIC data. Images were processed using Correlated Solutions Vic3D-8, using the parameters in Table 7. Notably, because the DIC pattern for the IR+DIC tests was much closer to optimal regarding feature size and density (see the inset in FIG. 23) compared to that used for TP+DIC tests, the subset size and VSG size were both able to be reduced without degrading the measurement quality. Additionally, the IR+DIC pattern maintained its integrity throughout deformation, and therefore, standard correlation could be used instead of incremental correlation.

IR and DIC Synchronization and Registration

Unlike the TP+DIC technique, which uses one pair of machine vision cameras for both the stereo-DIC strain and the phosphor thermography measurements, in the IR+DIC technique, the stereoscopic DIC imaging system and the IR camera are inherently independent. Therefore, the two sets of data must be synchronized in time and registered in space.

Temporal synchronization was incorporated in the experimental setup by using a delay/pulse generator to trigger acquisition of the DIC and IR cameras simultaneously. However, there was an unknown delay between the trigger and the first frame acquisition for the IR camera. Therefore, strain and temperature data were synchronized temporally during post-processing, by first manually identifying the image in which failure occurred in both the DIC images and the IR images, and then linearly interpolating the IR data onto the same time vector as the DIC data.

Spatial registration of the two data sets is also particularly important as the IR temperature data is in an Eulerian framework while the DIC strain data is in a Lagrangian framework. Transforming both data sets to the same three-dimensional coordinate system and point cloud can be aided by imaging a dot-grid calibration target with the DIC and IR cameras simultaneously, as in Soares et al. and Cholewa et al. See G. C. Soares et al., *Exp. Tech.* 45(5), 627 (2021); and N. Cholewa et al., *Exp. Mech.* 56(2), 145 (2015). However, this process requires a calibration target with contrast in both the visible and long-wave IR wavelengths, which was not made. Therefore, the two data sets were registered in post-processing.

At the end of this synchronization and registration process, the full-field IR temperature data was mapped to the same 3D point cloud, and at the same time steps, as the DIC data. The requirement for these processes, though, is one of the main disadvantages of the IR+DIC method over the TP+DIC method, where the temperature and strain data are inherently in the same coordinate system with no required synchronization or registration. Any misalignment (temporally or spatially) between the two data sets in the IR+DIC method could lead to analysis errors as the data is used for its intended application. Moreover, the IR data collected with a single IR camera necessitates that the camera be perpendicular to the test piece; any off-axis rotations can lead to temperature errors (due to the directionality of the sample emissivity, for example) and/or registration errors. In contrast, the TP+DIC method is fully stereoscopic for both the strain and temperature measurements and is applicable to non-planar samples.

IR+DIC Results and Comparison to TP+DIC

Figure 24:
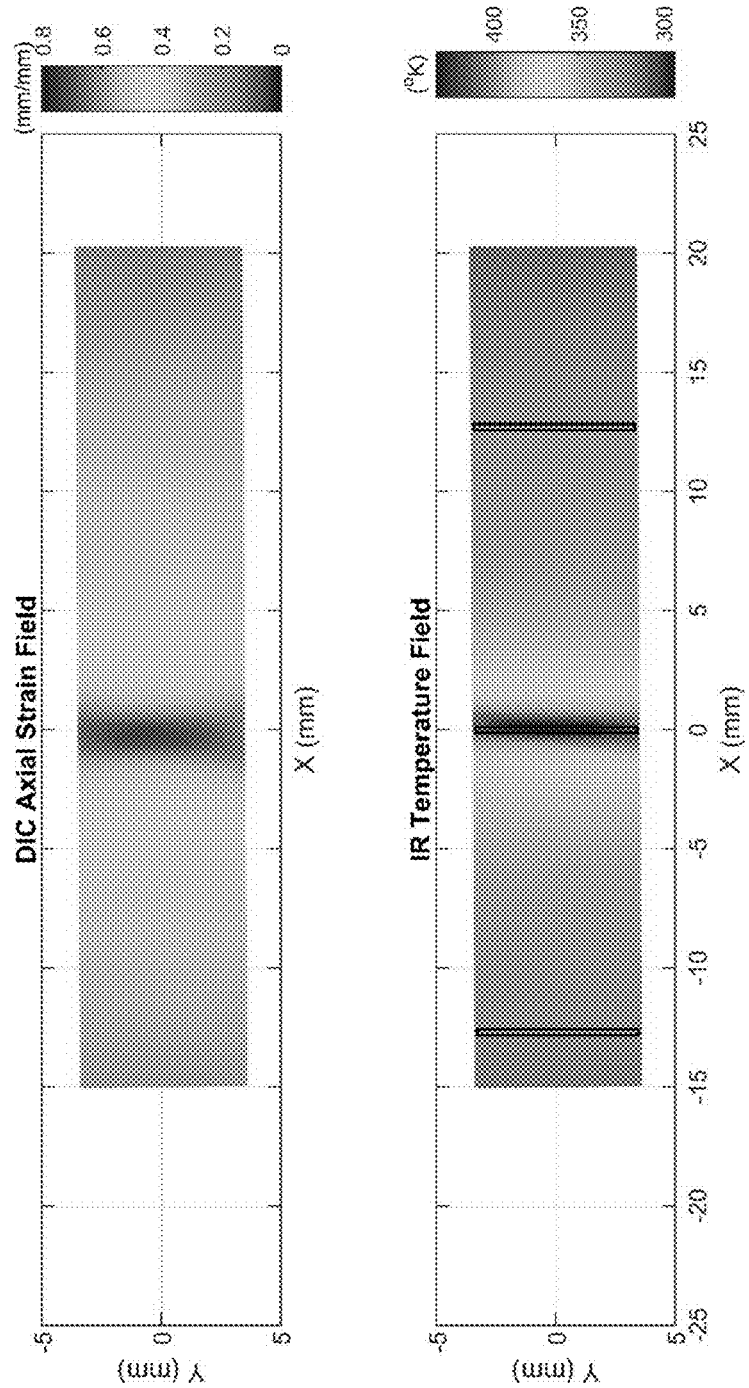
FIG. 24 shows full-field inferred axial strain (top) and surface temperature (bottom) contour plots of Sample S24 immediately prior to failure, with the locations of the mean temperatures used as "virtual" thermocouples (VTCs) highlighted in black boxes. Data is plotted in the undeformed, reference configuration. Because the cameras were rotated to align their long axis with the long axis of the sample, the left side of the plots corresponds to the top of the sample.

Combining the experimental and analysis methodology described heretofore, the combined thermo-mechanical response of the tensile bars can be examined with IR+DIC and results compared to those from TP+DIC. FIG. 24 shows contour plots of the strain and temperature fields quantified by IR+DIC for Sample S24 (tested at 0.08 $s^{-1}$) immediately prior to failure. Comparing these contours to the TP+DIC contours in FIG. 18 for Sample 6B (tested at 0.008 $s^{-1}$, an order of magnitude slower), globally similar responses are seen, with the highest strain and temperature rise occurring in the sample center where localized necking and eventually failure occurred.

Both the strain and temperature fields from IR+DIC are smoother than those from TP+DIC. The strain noise floor was again computed as the spatial standard deviation of the nominally uniform strain at a nominal strain of 0.2 mm/mm, and found to be 1.7-1.8 $10^{-3}$ mm/mm for the two IR+DIC samples (Table 7), nearly an order of magnitude lower than the strain noise floor for the TP+DIC data (Table 6). The lower noise of the IR+DIC strain field is attributed to having a more ideal DIC pattern, namely, a dense pattern of ca. 5 pixel diameter features that maintains its integrity during deformation, compared to the relatively sparse and large phosphor features used for TP+DIC that cracked during deformation. However, as noted previously in the section titled Variance Errors, when the phosphor pattern feature size was reduced (i.e. for Sample 2A), the pattern integrity was improved and the strain noise was reduced, suggesting that with further phosphor pattern optimization, the strain noise of TP+DIC could be commensurate with that of IR+DIC.

The smoother IR temperature field compared to the TP field is attributed to significantly more spatial filtering for the IR thermography. First, the pixel size of the IR camera was 0.34 mm, while the pixel size of the machine-vision cameras used for TP measurements was 0.05 mm, nearly an order of magnitude smaller. Second, the polynomial fit used to map IR temperature measurements from the Eulerian framework of the IR camera to the Lagrangian framework of the DIC point cloud provided another level of low-pass filtering to reduce the temperature noise. Certainly, a similar spatial filter could be applied to the TP measurements as well, though no such filter was applied in the current work in order to provide a more fundamental view of the raw TP data.

FIGS. 25A-D provide a summary comparison of the TP+DIC and IR+DIC thermo-mechanical results. Data from four samples are shown, Sample 5B (0.002 $s^{-1}$) and Sample 3B (0.08 s$^{-1}$) for the TP+DIC method, and Sample S8 (0.002 s$^{-1}$) and Sample S24 (0.08 s$^{-1}$) for the IR+DIC method.

Figure 25C:
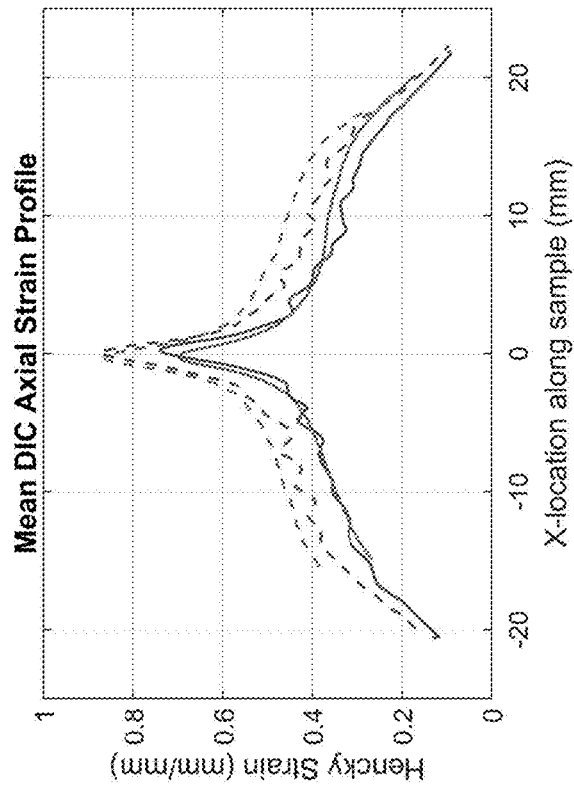
FIGS. 25A-D summarize the IR+DIC and TP+DIC results. Data is plotted in the reference, undeformed configuration, where X=0 indicates the center of the gauge section. The axial strain and temperature profiles are given for the image immediately prior to failure.
Figure 25D:
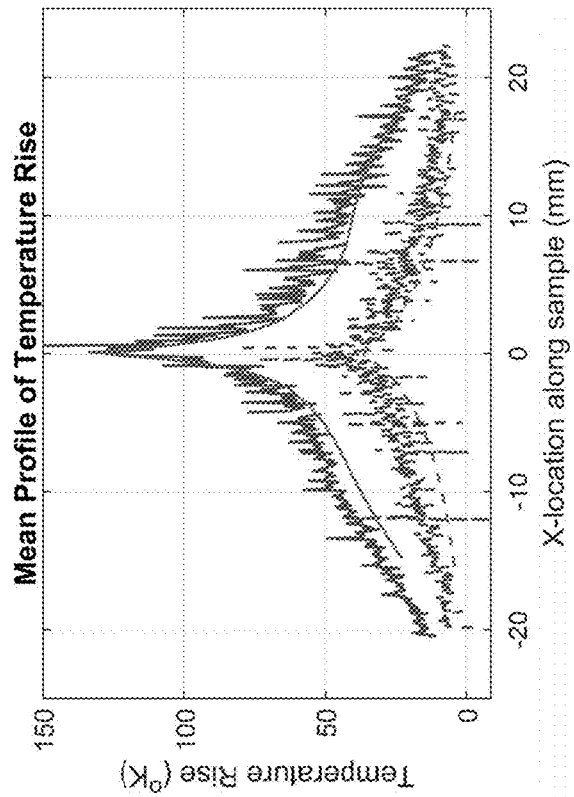
Figure 25A:
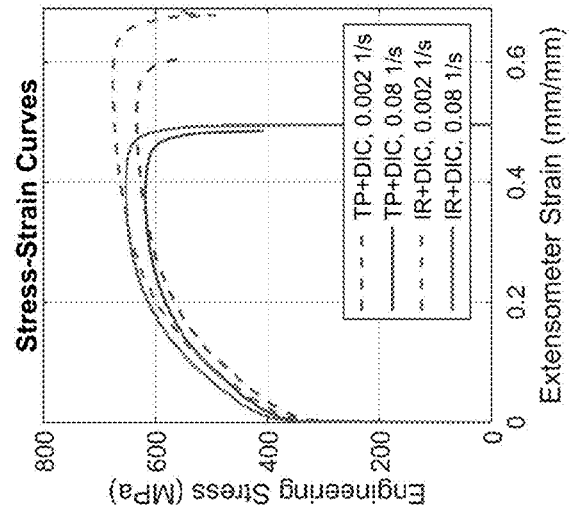

FIG. 25A plots the engineering stress-strain curves, where a couple of observations can be made. First, the yield stress increases and the strain-to-failure decreases with increasing strain rate, due to combined temperature and rate dependencies of 304L, as expected. Second, the IR+DIC stress is higher for both strain rates compared to the TP+DIC tests; this is due to material anisotropy, where the IR+DIC samples were oriented with the sample axis along the rolling direction of the sheet metal, whereas the TP+DIC samples were oriented diagonally at a 45° angle.

Figure 25B:
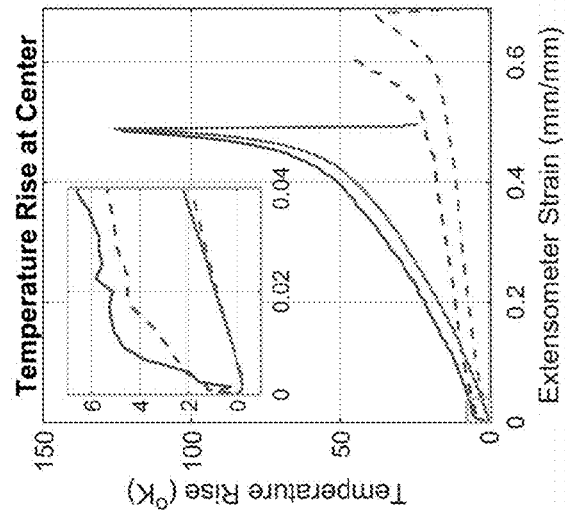

FIG. 25B shows the temperature rise of the virtual thermocouples extracted from the center of the sample from either the TP or the IR field data. Because the IR+DIC experimental setup had a different starting room temperature than the TP+DIC setup, the temperature rise above room temperature, rather than the absolute temperature, is plotted. At the beginning from 0.00-0.02 mm/mm strain (see the inset), the TP temperature rises, so that it is approximately 4.5° K higher than the IR temperature for both rates. Importantly, the IR temperature measurement does not show this increase, and instead shows a small dip in the temperature due to the thermo-elastic effect. This result corroborates the previous conclusion that the TP temperature rise is an artifact of the phosphor emission evolution and not a true temperature rise of the sample.

As the sample deforms, this initial discrepancy between the IR and TP temperatures grows slightly to 6.5° K at 0.4 mm/mm strain for both strain-rates. By the end of the test, the two temperature measurement methods agree well for the faster strain-rate, reaching maximum values for the temperature rise of 123.7° K and 125.9° K for the TP and IR measurements, respectively. For the slower test, the maximum values are 46.0° K and 37.6° K for the TP and IR methods, respectively. The lower value for the IR method could be a result of the increased convective heat loss in the experimental setup, which effects the slower rate test but not the nearly adiabatic faster rate test.

FIG. 25C plots the mean axial strain profile (averaged across the width of the gauge section) of the four samples immediately prior to failure. The results between the IR+DIC and TP+DIC measurements are in good agreement, indicating that the mechanical portion of both diagnostics performs well. As observed earlier in the corresponding contour plots, the TP+DIC strain measurements are noisier than the IR+DIC measurements, but a more optimal phosphor DIC pattern (i.e. Sample 2A) reduces this noise.

FIG. 25D plots the mean profile of the temperature rise immediately prior to failure. Again, the TP and IR measurements show good agreement for both strain rates. The IR measurements are smoother, likely due to increased spatial filtering as mentioned previously; the noise of the TP measurements could be improved by better treatment of pixels with incomplete phosphor illumination and some spatial filtering. The lower overall sample temperature for the IR measurements for the lower strain rate is again hypothesized to be caused by the increased convective heat losses due to differences in the experimental setup.

Compared to the IR+DIC method, the TP+DIC diagnostic has several advantages, including: (a) high-contrast DIC patterns generated by the phosphors at elevated temperatures; (b) reduced equipment burden, since both measurements are performed with a single set of machine vision cameras; (c) reduced post-processing requirements to align two disparate data sets, since all data is inherently in a common coordinate system and on a common grid of points; and (d) elimination of emissivity concerns, especially regarding the evolution of emissivity as a function of temperature or deformation (though the phosphor emission was found to evolve as a function of applied strain). One disadvantage of TP+DIC is the necessity to enclose the entire load frame in a light-tight blackout tent, to prevent room lights from affecting the phosphor emission intensity measurements. On the other hand, IR measurements may also be affected by reflected radiation from the surrounding environment and require care in the experimental setup to mitigate these reflections. Both techniques require careful characterization and correction of the nonlinearity and spatial non-uniformity of the detectors, and both require calibrations to convert gray-level intensity (or intensity-ratio) values to temperatures. Because IR thermography is more established, these corrections/calibrations are typically done by the IR camera manufacturer and applied in proprietary software, thus reducing the burden on the end-user. With further development, TP thermography could reach a similar technology-readiness level.

The present invention has been described as a thermographic phosphor digital image correlation. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A ratio method for phosphor thermography, comprising providing a specimen coated with a thermographic phosphor,
illuminating the specimen with incident light having a wavelength within an absorption feature of the thermographic phosphor,
collecting and spectrally filtering an emission of the thermographic phosphor for an exposure time into a first spectral band image of a first camera and a second spectral band image of a second camera of a stereoscopic imaging system,
correcting the first and second cameras for non-linear behavior so that an image intensity of each pixel is linearly proportional to a number of photons from the incident light impinging upon each pixel during the collection step,
spatially registering the first and second spectral band images using stereo digital image correlation,
calculating ratios of the intensities of the first and second spectral bands for each pixel of the spatially registered spectral band images, and
inferring a spatially resolved temperature image of the specimen from the spatially resolved intensity ratios using a temperature-vs-intensity ratio calibration curve, thereby providing a time-resolved, full-field thermographic image of the specimen.

2. The ratio method of claim 1 wherein the temperature-vs-intensity ratio calibration curve is generated pixel-wise by an in situ calibration procedure.

3. The ratio method of claim 1, wherein the collecting, calculating, and inferring steps are repeated for a plurality of times to provide a plurality of time-resolved, full-field thermographic images of the specimen.

4. The ratio method of claim 1, wherein the thermographic phosphor coating is patterned on the substrate, and wherein the invention further comprises imaging the pattern and tracking the pattern image with stereo digital image correlation as the specimen is deformed.

5. The ratio method of claim 4, wherein time-resolved, full-field strain images are calculated from the tracked pattern images.

6. The ratio method of claim 1, further comprising collecting temperature-vs-intensity ratio data for each of the pixels in an image of a constant temperature calibration sample and fitting a curve on a pixel-by-pixel basis to the temperature-vs-intensity ratio data to eliminate collection optics-dependent spatial non-uniformities in the spatially resolved temperature image.

* * * * *